(12) United States Patent
Ayala et al.

(10) Patent No.: US 11,613,140 B2
(45) Date of Patent: *Mar. 28, 2023

(54) METHODS AND SYSTEMS FOR PRINTING VIBRANT GREY COLORS ON PLASTIC CARDS

(71) Applicant: Entrust Corporation, Shakopee, MN (US)

(72) Inventors: Miguel Ayala, Shakopee, MN (US); Heather Maershbecker, Shakopee, MN (US); Rajesh K. Juriasingani, Shakopee, MN (US); John Knaack, Shakopee, MN (US); Wade Kragtorp, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/850,258

(22) Filed: Apr. 16, 2020

(65) Prior Publication Data

US 2020/0238746 A1 Jul. 30, 2020

Related U.S. Application Data

(63) Continuation of application No. 16/428,310, filed on May 31, 2019, now Pat. No. 10,661,593.

(Continued)

(51) Int. Cl.
    *B42D 25/405* (2014.01)
    *B42D 25/45* (2014.01)

(52) U.S. Cl.
    CPC .......... *B42D 25/405* (2014.10); *B42D 25/45* (2014.10); *B32B 2425/00* (2013.01)

(58) Field of Classification Search
    CPC ..... B32B 2425/00; B41M 3/14; B42D 25/305
    See application file for complete search history.

(56) References Cited

U.S. PATENT DOCUMENTS 4,825,054 A ‡ 4/1989 Rust ................ G06K 1/128
    235/38
5,266,781 A ‡ 11/1993 Warwick .............. B07C 1/00
    235/37

(Continued)

FOREIGN PATENT DOCUMENTS

EP    3067217 A1    9/2016
WO    2005/062978 A2    7/2005

OTHER PUBLICATIONS

International Search Report and Written Opinion documentation dated Oct. 25, 2019 for PCT patent application No. PCT/IB2019/054551, 12 pages.‡

(Continued)

*Primary Examiner* — King Y Poon
*Assistant Examiner* — Michael L Burleson
(74) *Attorney, Agent, or Firm* — Hamre, Schumann, Mueller & Larson, P.C.

(57) ABSTRACT

Methods and systems are disclosed for printing vibrant grey color(s) on plastic cards. The following features, which can be used individually or in any combination thereof, can be implemented to achieve the vibrant grey color(s): 1) use of CMYK pigment inks to achieve CMYK printing; 2) a pixel extraction process and/or a print trapping process; 3) two separate print commands including a CMY (or CMYK)+ blending print command and a K+blending print command; and 4) proper card set-up.

15 Claims, 23 Drawing Sheets

Related U.S. Application Data

(60) Provisional application No. 62/678,834, filed on May 31, 2018.

(56) References Cited

U.S. PATENT DOCUMENTS

| | | | |
|---|---|---|---|
| 6,783,067 B2 ‡ | 8/2004 | Kreuter | B41J 3/283 235/38 |
| 6,894,710 B2 ‡ | 5/2005 | Suzuki | B41J 2/325 347/21 |
| 6,902,107 B2 ‡ | 6/2005 | Shay | G06K 17/00 235/38 |
| 7,398,972 B2 ‡ | 7/2008 | Schuller | B41J 3/60 271/18 |
| 7,434,728 B2 ‡ | 10/2008 | Paulson | B41J 13/12 235/37 |
| 7,991,229 B2 * | 8/2011 | Xiao | H04N 1/40062 382/176 |
| 8,270,046 B2 * | 9/2012 | Tamura | G06T 11/001 358/500 |
| 10,661,593 B2 * | 5/2020 | Ayala | B42D 25/378 |
| 2001/0014182 A1 | 8/2001 | Funayama et al. | |
| 2001/0055130 A1 * | 12/2001 | Geurts | G06K 15/02 358/530 |
| 2005/0269818 A1 * | 12/2005 | Forde | B42D 25/328 283/74 |
| 2006/0044239 A1 * | 3/2006 | Kamijo | G09G 3/367 345/88 |
| 2007/0152067 A1 | 7/2007 | Bi et al. | |
| 2009/0033956 A1 ‡ | 2/2009 | Tamagawa | G06K 15/02 358/1 |
| 2009/0207462 A1 * | 8/2009 | Arimoto | H04N 1/38 358/509 |
| 2010/0020151 A1 ‡ | 1/2010 | Jones | B42D 25/435 347/10 |
| 2010/0259771 A1 ‡ | 10/2010 | Sakamoto | H04N 1/40068 358/1 |
| 2010/0332356 A1 * | 12/2010 | Spolar | G06Q 30/0641 705/27.1 |
| 2011/0228361 A1 ‡ | 9/2011 | Ohkawa | H04N 1/56 358/50 |
| 2012/0196671 A1 * | 8/2012 | Hornik | G07F 17/3227 463/25 |
| 2012/0273576 A1 * | 11/2012 | Tomczyk | B42D 25/23 235/488 |
| 2013/0235394 A1 * | 9/2013 | Jordan | B41J 3/407 358/1.5 |
| 2016/0023473 A1 ‡ | 1/2016 | Fischer | B41M 3/14 347/21 |
| 2018/0117905 A1 | 5/2018 | Zaborowski et al. | |

OTHER PUBLICATIONS

Extended European Search Report; European Patent Application No. 19810699.9, dated Jan. 7, 2022 (8 pages).

\* cited by examiner
‡ imported from a related application

Fig. 3D

METHODS AND SYSTEMS FOR PRINTING VIBRANT GREY COLORS ON PLASTIC CARDS

FIELD

This disclosure relates generally to printing on plastic cards including, but not limited to, financial (e.g., credit, debit, or the like) cards, driver's licenses, national identification cards, business identification cards, gift cards, and other plastic cards.

BACKGROUND

Plastic cards are commonly printed using a suitable printing mechanism in a card processing system. One known plastic card printing mechanism is a retransfer printer. Retransfer printing is a known printing process where an image is printed by a printing mechanism onto an intermediate retransfer material. After the image is printed, the intermediate retransfer material is transferred by lamination onto the surface of the plastic card that is to bear the printed image. Further information on retransfer printing can be found in, for example, U.S. Pat. No. 6,894,710 which is incorporated herein by reference in its entirety. Another known plastic card printing mechanism is a direct-to-card printing mechanism where the printing is applied directly to a surface of the plastic card from a print ribbon.

Most plastic card printing uses CMY printing, not CMYK. Printing black text and barcodes using black dye-printing lacks sufficient density (i.e. darkness), so instead greys are printed using cyan (C), magenta (M), yellow (Y) blended together. Due to limitations of not being able to consistently balance the C, M and Y to produce a neutral grey, these composite greys tend to have shades of cyan, magenta or yellow.

SUMMARY

Methods and systems are disclosed for printing vibrant grey color(s) and/or specialty colorant materials (e.g., gold, silver) on plastic cards such as financial (e.g., credit, debit, or the like) cards, driver's licenses, national identification cards, business identification cards, gift cards, and other plastic or composite cards which bear personalized data unique to or assigned specifically to the cardholder and/or which bear other card information. The term "plastic card" as used herein is intended to encompass cards that are completely or substantially plastic, as well as cards that have non-plastic or composite components and cards having other formulations that function like the card types indicated above. Cards that are encompassed by the term "plastic cards" often bear printed personalized data unique to or assigned specifically to the cardholder, such as the name of the cardholder, an account number, an image of the face of the cardholder, and other data. In some embodiments, the cards can include a magnetic stripe and/or integrated circuit chip that holds/stores personalized data unique to or assigned specifically to the cardholder.

Four features described herein, which can be used individually or in any combination thereof, can be used to achieved vibrant grey color(s) printed on plastic cards. The four features include: 1) use of CMYK pigment inks to achieve CMYK printing; 2) a pixel extraction process and/or a print trapping process; 3) two separate print commands including a CMY (or CMYK)+print trapping/blending print command and a K (black)+print trapping/blending print command; and 4) proper card set-up.

A card that is printed with the vibrant grey color(s) as described herein may also be referred to as a vibrant grey card. A grey card is a plastic card where any portion of a surface of the plastic card is printed with one or more grey colors. In some embodiments, the vibrant grey can form a background image that is printed on either the front or back surface of the plastic card. In other embodiments, the vibrant grey can form text that is printed on either the front or back surface of the plastic card. The vibrant grey described herein can form any printing on any surface (i.e. front and/or back) of the plastic card.

The term color as used herein can refer to colors other than those (for example, grey, black, white, gold, and/or silver, etc.) that are rendered by a monochrome ribbon (e.g. Black, Gold, Silver, etc.), such as red, green, blue, yellow, and the like. The surface of a grey card described herein may be printed entirely grey with one or more shades of grey. The surface may also include printed black color and/or white color formed by either the material of the plastic card substrate or by printing ink to achieve the white color. The surface may also include printed colors such as CMY, red, green, blue, colors resulting from combinations of CMY, and the like.

Printing on a surface of plastic card as described herein includes retransfer printing, direct-to-card printing, and any other printing technique employing CMYK printing that results in grey printed on a surface of the plastic card.

In one embodiment, a method of printing on a surface of plastic card in a plastic card printing mechanism can include obtaining a source digital image. Each pixel of the source digital image is then scanned to identify each pixel as either color or monochrome. A color digital image is generated from the identified color pixels and a monochrome digital image is generated from the identified monochrome pixels. To generate the color digital image, it is determined if red, green, blue (RGB) values of each pixel of the source digital image are substantially equal, and for every pixel of the source digital image where the RGB values are substantially equal, every pixel with substantially equal RGB values is replaced with a white pixel. In addition, to generate the monochrome digital image, every pixel at coordinates corresponding to the replaced pixels in the color digital image is replaced with grey pixels. The color digital image and the monochrome digital image are then sent to the plastic card printing mechanism, and the color digital image is printed on the surface of the plastic card using cyan, magenta and yellow pigment ink and the monochrome digital image is printed on the surface of the plastic card using black pigment ink to produce a combined image on the surface.

In one embodiment, when printing on the surface of a plastic card, two images are generated: one image (the color image) targets the CMY pigment ribbons and the other image (the monochrome image) targets the monochrome ribbon (e.g. Black, Gold, Silver, etc.). In some embodiments, the monochrome ribbon can be a pigment ribbon. It will be appreciated that there can be a few methods to achieve this goal. In one embodiment, a source image can be used as a template for creating the color and monochrome images. In such embodiment, the color and monochrome images have the same dimension (for example, width and height) as the source image. Initially, when the color and monochrome images are created, the color and monochrome images can be all white, black, or otherwise undefined in the pixel make-up. After the color and monochrome images are created, the source image can be scanned (for example, pixel-by-pixel). The methods and system described herein can determine which image (color or monochrome) to copy (or draw) the pixel at the x and y coordinates corresponding to the original position of the pixel on the source image. In another embodiment, the source image can be used as the color image and a monochrome image (of equal dimension of the source image) can be created by scanning the source image, detecting (via the methods and systems described herein) which pixels of the source image should be copied (drawn) onto the monochrome image, and after copying the pixel of the source image to the monochrome image, replacing the pixel on the color image with a white pixel (indicating that the pixel is not to be rendered by, for example, the CMY ribbons). In yet another embodiment, the source image can be used as the monochrome image, and a color image (of equal dimension of the source image) can be created by scanning the source image, detecting (via the methods and systems described herein) which pixels of the source image should be copied (drawn) onto the color image, and after copying the pixel of the source image to the color image, replacing the pixel on the monochrome image with a white pixel (a concept known as punch-out).

In another embodiment, a method of printing on a surface of plastic card in a plastic card printing mechanism can include obtaining a source digital image. Each pixel of the source digital image is then scanned to identify each pixel as either color or monochrome, and a color digital image is generated from the identified color pixels and a monochrome digital image is generated from the identified monochrome pixels. When generating the color digital image, print trapping is applied, and when generating the monochrome digital image print trapping is also applied. The color digital image and the monochrome digital image are then sent to the plastic card printing mechanism, and the color digital image is printed on the surface of the plastic card using cyan, magenta and yellow pigment ink and the monochrome digital image is printed on the surface of the plastic card using black pigment ink to produce a combined image on the surface.

In still another embodiment, a method of printing on a surface of plastic card in a plastic card printing mechanism can include obtaining a source digital image. Each pixel of the source digital image is then scanned to identify each pixel as either color or monochrome. A color digital image is generated from the identified color pixels and a monochrome digital image is generated from the identified monochrome pixels. To generate the color digital image, it is determined if red, green, blue (RGB) values of each pixel of the source digital image are substantially equal, and for every pixel of the source digital image where the RGB values are substantially equal, every pixel with substantially equal RGB values is replaced with a white pixel. In addition, when generating the color digital image, print trapping is applied. In addition, to generate the monochrome digital image, every pixel at coordinates corresponding to the replaced pixels in the color digital image is replaced with grey pixels. In addition, when generating the monochrome digital image, print trapping is also applied. The color digital image and the monochrome digital image are then sent to the plastic card printing mechanism, and the color digital image is printed on the surface of the plastic card using cyan, magenta and yellow pigment ink and the monochrome digital image is printed on the surface of the plastic card using black pigment ink to produce a combined image on the surface.

In yet still another embodiment, a plastic card printing mechanism for printing on a surface of a plastic card is disclosed. The plastic card printing mechanism can include a print head. The plastic card printing mechanism can also include a print ribbon having cyan, magenta, yellow and black pigment ink ribbon panels. The plastic card printing mechanism can further include a controller. The controller can be configured to scan each pixel of a source digital image to identify each pixel as either color or monochrome. The controller can also be configured to generate a color digital image from the identified color pixels and a monochrome digital image from the identified monochrome pixels. The controller can further be configured to perform at least one of the following: a) for the color digital image, replace every pixel at coordinates corresponding to the monochrome pixels with white pixels; and for the monochrome digital image, replace every pixel at coordinates corresponding to the color pixels with white pixels; b) apply print trapping when generating the color digital image, and apply print trapping when generating the monochrome digital image; c) a) and b); d) 1) for the color digital image, determine if red, green, blue (RGB) values of each pixel of the source digital image are substantially equal, and for every pixel of the source digital image where the RGB values are substantially equal, replace every pixel with equal RGB values with a white pixel; and 2) for the monochrome digital image, replace every pixel at coordinates corresponding to the replaced pixels in 1) with grey pixels; or e) b) and d). Also the controller can be configured to send the color digital image and the monochrome digital image to the plastic card printing mechanism. The plastic card printing mechanism can be configured to print the color digital image on the surface of the plastic card using the cyan, magenta and yellow pigment ink ribbon panels and print the monochrome digital image on the surface of the plastic card using the black pigment ink ribbon panel to produce a combined image on the surface. In addition, the plastic card printing mechanism can be configured to print the color digital image and the monochrome digital image on a transferrable printing receptive layer of a retransfer material to produce the combined image, and thereafter transfer the transferrable printing receptive layer containing the combined image to the surface of the plastic card. Furthermore, the source digital image can contain two or more of a background image, a card issuer name, a card issuer logo, a personal account number, a cardholder name, an expiration date, a payment network name, and a payment network logo. Moreover, the plastic card can include a financial card having at least one of a magnetic stripe and an integrated circuit chip. In addition, the controller can be configured to scan each pixel in the source digital image to detect monochrome pixels. For each detected monochrome pixel, the controller can be configured to determine if there are neighboring color pixels. If there are neighboring color pixels, the controller can be configured to add the detected monochrome pixel to the color digital image. If there are not neighboring color pixels, the controller can be configured to change the detected monochrome pixel to a white pixel. Furthermore, the controller can be configured to scan each pixel in the source digital image to detect color pixels. For each detected color pixel, the controller can be configured to determine if there are neighboring monochrome pixels. If there are neighboring monochrome pixels, the controller can be configured to change the detected color pixel to a monochrome pixel and add the monochrome pixel to the monochrome digital image.

In yet still another embodiment, a plastic card processing mechanism is disclosed. The plastic card processing mechanism can include the plastic card printing mechanism of the above embodiment. The plastic card processing mechanism can also include at least one of the following mechanisms: a laminating mechanism, an integrated circuit chip programming mechanism, a magnetic stripe read/write mechanism, an embossing mechanism, an indent printing mechanism, a card cleaning mechanism, a laser mechanism, or a card de-bowing mechanism.

The techniques described herein can be implemented in any type of plastic card printing mechanism that uses CMYK printing. The plastic card printing mechanism can be used in a desktop plastic card printer that has a relatively small footprint intended to permit the desktop plastic card printer to reside on a desktop and that is designed to personalize plastic cards in relatively small volumes, for example measured in tens or low hundreds per hour. An example of a desktop plastic card printer is the CD800 Card Printer available from Entrust Datacard Corporation of Shakopee, Minn. Additional examples of desktop printers are disclosed in U.S. Pat. Nos. 7,434,728 and 7,398,972, each of which is incorporated herein by reference in its entirety. The plastic card printing mechanism can also be part of a large volume batch plastic card production machine, often configured with multiple processing stations or modules, typically referred to as a central issuance system, that processes multiple plastic cards, at the same time and is designed to personalize plastic cards in relatively large volumes, for example measured in the high hundreds or even thousands per hour. An example of a central issuance system is the MX or MPR-lines of central issuance systems available from Entrust Datacard Corporation of Shakopee, Minn. Additional examples of central issuance systems are disclosed in U.S. Pat. Nos. 4,825,054, 5,266,781, 6,783,067, and 6,902,107, all of which are incorporated herein by reference in their entirety. In some embodiments, the card printer (desktop or central issuance) can include a mechanism to read and/or write data to a magnetic strip and/or program an integrated circuit chip on the card.

DRAWINGS

FIG. 3D illustrates still another example of a possible continuation of the pixel evaluation order of FIG. 3C.

Like reference numbers represent like parts throughout.

DETAILED DESCRIPTION

Figure 1A:
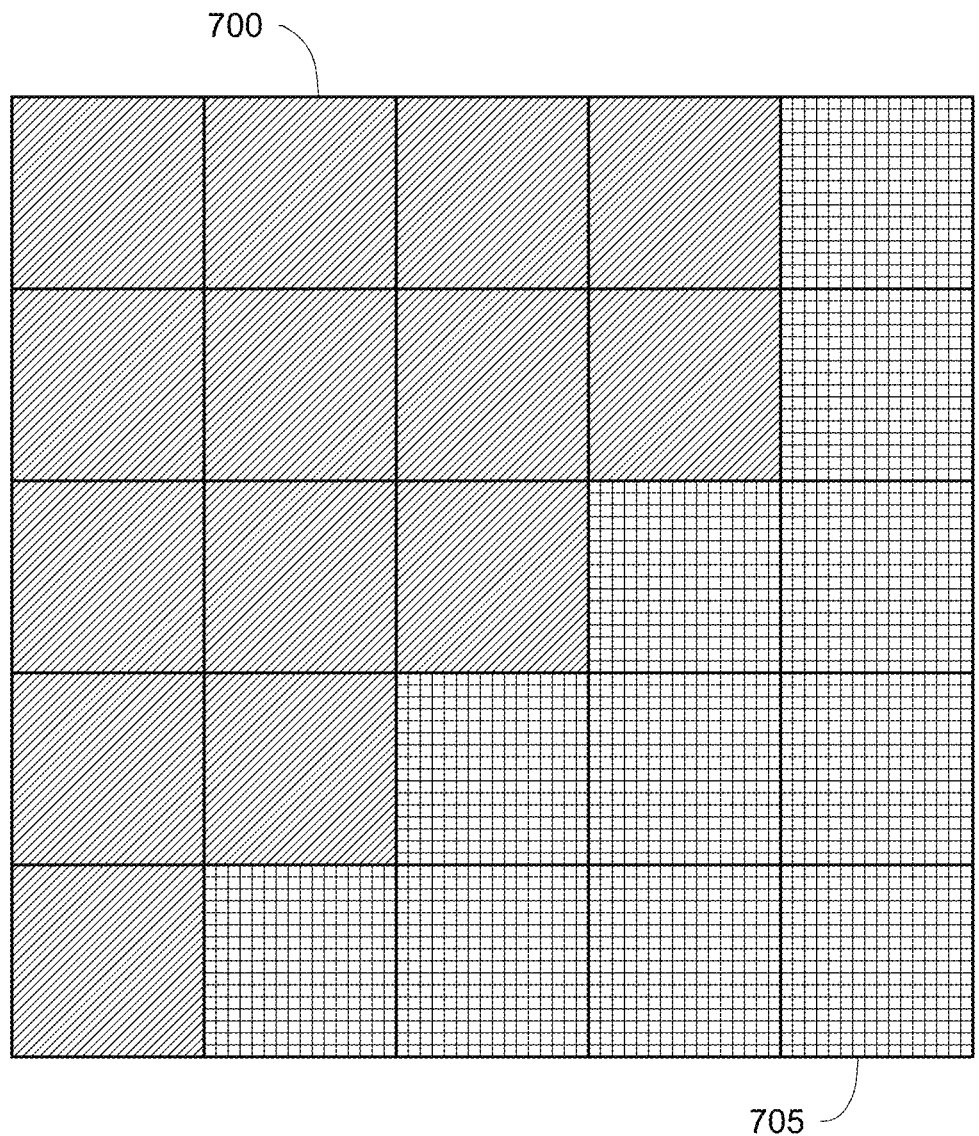
FIG. 1A represents a source digital image containing grey pixels and color pixels represented by cells as described herein.

Techniques are described below for printing, for example, vibrant grey color(s) on plastic cards such as financial (e.g., credit, debit, or the like) cards, driver's licenses, national identification cards, business identification cards, gift cards, and other plastic or composite cards which bear personalized data unique to or assigned specifically to the cardholder and/or which bear other card information. The term "plastic card" as used herein encompasses cards that are completely or substantially plastic, as well as cards that have non-plastic or composite components and cards having other formulations that function like the card types indicated above. Cards that are encompassed by the term "plastic cards" often bear printed personalized data unique to or assigned specifically to the cardholder, such as the name of the cardholder, an account number, an image of the face of the cardholder, and other data.

The following features can be implemented to achieve vibrant grey color(s) printed on plastic cards. The features can be used individually or in any combination thereof. The features include: 1) use of CMYK pigment inks to achieve CMYK printing; 2) a pixel extraction process and/or a print trapping process; 3) two separate print commands including a CMY (or CMYK)+blending print command and a K+blending print command; and 4) proper card set-up.

CMYK Printing

There are two primary types of ink traditionally used for printing on plastic cards:

a. Dye inks: dye inks interact with the plastic card surface by seeping into the plastic material and completely absorbs into the card surface. In plastic card printing, dye inks are not typically dithered when printed because the print head has fine control over the amount of dye transferred to produce dozens of different shades directly.

b. Pigment inks: pigment inks bond to the top surface of the card and sits on top of the plastic material. Print heads printing with pigment inks can generally only generate a few distinct dot sizes on the card surface, which results in very few shades of each color. Thus, in plastic card printing, the use of pigment inks typically require a printed image to be dithered (e.g. using a clustered-dot dither) in order to get an acceptable number of different shades of each color on the card surface.

Dye inks generally only come in three primary printing colors (C, M, Y) because K dye inks cannot achieve the density required to produce good black colors on plastic card substrates. Therefore, plastic card printing mechanisms that use dye ink must use a pigment ink for their K ink. Because the appearance of dithered pigment K ink sitting on top of the card surface looks very different from the non-dithered colored dye CMY inks that absorb into the card surface, color printing on plastic cards with dye cannot use black for true CMYK printing (where the K pigment ink is used to blend with the C, M and Y pigment inks in a printed image). Dye inks are limited to CMY printing for the color portion of a card image and K pigment ink printing for any black personalization data and black bar codes.

To achieve vibrant grey color(s) on plastic cards as described herein, CMYK pigment inks are used to produce CMYK printing on the plastic cards. In one embodiment, the CMYK printing can include CMY+K printing. In such embodiment, the color image is rendered with CMY (where the K is not blended), and the monochrome image is rendered with K. In another embodiment, the CMYK printing can include CMYK+K printing. In such embodiment, the color image is rendered with CMYK (to support, for example, true CMYK printing where the K is blended), and the monochrome image is rendered with another K (for example, another K ribbon). All four of the CMYK pigment inks have similar characteristics which allow the production of a high-quality color image on the plastic card. The CMYK pigment inks can be provided on a common ink ribbon with the pigment ink disposed on a carrier, with the CMYK pigments inks arranged in a repeating sequence of discrete, alternating CMYK panels as is well known in the art. In another embodiment, the CMYK pigment inks can each be provided on their own ink ribbon (i.e. a C ribbon, an M ribbon, a Y ribbon, and a K ribbon), with the plastic card being sequentially transported past each ink ribbon for printing of each CMYK color. In addition, some of the panels can contain an additional or specialty colorant material that is not CMYK pigment ink. Examples of additional or specialty colorant materials include, but are not limited to, a silver colorant material and/or a gold colorant material. In addition, in some embodiments, some of the panels can be fluorescent material panels that are used to print a fluorescent material. The fluorescent material (if used) is generally transparent to allow viewing of printing that may end up underneath the fluorescent material. In addition, the print ribbon can contain additional panels in each sequence such as a panel of overlay material. It will be appreciated that in addition to ribbon(s), laser and/or inkjet (for example, drop on demand inkjet) printing can be used to print pigment.

Pixel Extraction and/or Print Trapping

Two separate data processing techniques can be performed on a source digital image to improve the resulting printed image on the plastic card. One data processing technique will be referred to herein as pixel extraction. The other data processing technique will be referred to herein as print trapping. In some embodiments, the pixel extraction and print trapping can be used together. In other embodiments, only pixel extraction can be used without print trapping. In still other embodiments, only print trapping can be used without pixel extraction.

Pixel extraction is a process that scans a source image, for the purpose of generating two distinct images: a color image which will be rendered with, for example, CMY or CMYK, and a monochrome image which will be rendered with a monochrome ribbon (e.g. Black, Gold, Silver, etc.). All pixels of the source image are scanned (or inspected) to determine which pixel should be copied (drawn) on the color image and which pixel should be copied (drawn) on the monochrome image. The use of a monochrome ribbon, and targeting specific pixels to be rendered by the monochrome ribbon, can provide the ability to apply spot color (of the specific pixels) anywhere on the final printed image(s). In the description of the methods and systems below, an example of grey pixel extraction and spot color are used to clarify the concepts. It will be appreciated that the technique described herein can be applicable to any other spot color (of the specific pixels), such as Gold and Silver.

For grey pixel extraction targeting a black monochrome pigment ribbon, two images are generated: a color image that contains all the color (i.e., non-grey) pixels of the source image with all the grey pixels being extracted (for example, filled with white pixels), and a monochrome image that contains all the grey pixels of the source image with all the color pixels being extracted (for example, filled with white pixels). Pixel extraction can allow proper control of printing the grey pixels and save cost by using black (K) to control the process than using the corresponding amounts of colored inks (for example, CMY or CMYK).

In one embodiment, a source image for printing is scanned pixel by pixel. The source image includes a front card image and a back card image for the plastic card printers. The source image can be a composite image that includes all relevant text (e.g. Personal Account Number, customer's name, etc.), customer's photo and/or background image. The source image can be a source digital image. Each pixel of the source image can be represented as a 24-bit RGB or a 32-bit Alpha-RGB pixel or the like. It will be appreciated that 8-bit and/or 64-bit RGB (or Alpha-RGB) source image can be used as well. Scanning the source image can be defined as processing the digital data of the digital source image pixel by pixel. A color image and a monochrome image can be generated through the scan process. The generated color image can contain all the color (i.e., non-grey) pixels of the source image with all the grey pixels of the source image extracted (i.e., filled with white pixels). The generated color image can be 24-bit RGB or 32-bit Alpha-RGB image (same as the source image). The generated monochrome image can contain all the grey pixels of the source image with all the color pixels of the source image extracted (i.e., filled with white pixels). The generated monochrome image can be an 8-bit (256 greyscale pixels) monochrome image.

In an embodiment, each of the color image and the monochrome image can start with an image that has the same dimensions as the source image but filled with all white pixels. In another embodiment, each of the color image and the monochrome image can start with an empty image. During the scanning process, the source image is scanned pixel by pixel. Typically, a pixel is defined by its RGB values (or ARGB values for Alpha-RGB). An embodiment that uses grey pixel extraction is described herein as an example. In such embodiment, if the RGB values of the pixel of the source image are determined to be all equal or substantially equal (for example, R=100, G=100, B=100), the pixel is determined/defined as a grey (i.e., monochrome) pixel. The grey pixel of the source image is added (or copied) to the monochrome image at the equivalent coordinates with respect to the source image. In the color image, the equivalent coordinates with respect to the grey pixel of the source image contains an originally filled white pixel. If the RGB values of the pixel of the source image are determined to be not all substantially equal (for example, R=10, G=100, B=255), the pixel is determined/defined as a non-grey pixel (i.e., a color pixel). Under such definitions, a white pixel (R=255, G=255, B=255) is a grey pixel, a black pixel (R=0, G=0, B=0) is a grey pixel, and anything that is not a grey pixel is a color pixel. It will be appreciated that in some embodiments, white pixels are referred to (see, for example, FIGS. 5 and 6) although white pixels are considered grey pixels under the definition of grey pixel. It will also be appreciated that the definition of grey pixel is used to describe an embodiment of grey pixel extraction.

If the pixel of the source image is a color pixel, the color pixel is added (or copied) to the color image at the equivalent coordinates with respect to the source image. In the monochrome image, the equivalent coordinates with respect to the color pixel of the source image contains an originally filled white pixel.

The above pixel extraction process can be an essential step as the process allows for the rendering of grey pixels using K pigment and color pixels using CMY pigment—the color image (that contains all color pixels) can be printed using CMY (or CMYK) pigment, and the monochrome image (that contains all grey pixels) can be printed using K pigment.

In one embodiment, the above definition of a grey pixel (i.e., if the RGB values of the pixel are determined to be all equal or substantially equal (for example, R=100, G=100, B=100), then the pixel is defined as a grey pixel) may not be sufficient as there are many colors which appear grey to the eye but where the RGB values are not equivalent. Those colors are defined as perceptual grey. For example, a pixel with RGB values (R=100, G=99, B=101). Depending on the background image (for example, the monochrome image) of the plastic card, there may be large areas of perceptual grey which end up on the color image due to the above definition of a grey pixel. To compensate the strict definition, a greyscale variance value is used in the definition of the grey pixel. The greyscale variance value provides a certain tolerance on what is considered grey during the pixel scanning process of the source image when generating the color and/or monochrome images.

In one embodiment, a formula is used to calculate the greyscale variance value. The formula calculates a midpoint (which is the greyscale variance value) between the maximum value and the minimum value of the three RGB values. Then the midpoint is compared to a threshold configured by the user during printing setup. If the midpoint is below or at the threshold, the pixel is considered as a grey pixel and is added to the monochrome image. If the midpoint is above the threshold, the pixel is considered as a color pixel and is added to the color image. The formula can be presented in pseudo code as:

min=MIN(R,G,B)
max=MAX(R,G,B)
midpoint=(max−min)/2
IsGrey=(midpoint<=threshold)

For example, for a pixel with RGB values (R=100, G=99, B=101) and the threshold is set to 1, min=MIN(R,G,B)=MIN(100,99,101)=99, max=MAX(R,G,B)=MAX(100, 99,101)=101, midpoint (i.e., the greyscale variance value)= (max−min)/2=(101−99)/2=1, the equation "midpoint (which is 1)<=threshold (which is 1 in this example)" is TRUE, and IsGrey is TRUE. Therefore, the pixel with RGB values (R=100, G=99, B=101) of the source image is considered as a grey pixel and is added into the monochrome image.

It will be appreciated that before the near-grey color pixel (the perceptual grey pixel, where IsGrey is TRUE) in the above example can be added to the monochrome image, the near-grey color pixel has to be converted to greyscale (i.e., a grey pixel with RGB values being all equal). There are a number of ways for the conversion and a user is provided with many configurable options. In the above example the RGB values of the near-grey color pixel can be converted to all min values (R=99, G=99, B=99), all max values (R=101, G=101, B=101), or mid values such as (R=100, G=100, B=100).

For another example, for a pixel with RGB values (R=99, G=96, B=100) and the threshold is set to 1, min=MIN(R, G,B)=MIN (99,96,100)=96, max=MAX(R,G,B)=MAX(99, 96,100)=100, midpoint (i.e., the greyscale variance value)= (max−min)/2=(100−96)/2=2, the equation "midpoint (which is 2)<=threshold (which is 1 in this example)" is FALSE, and IsGrey is FALSE. Therefore, the pixel with RGB values (R=99, G=96, B=100) of the source image is considered as a color pixel and is added into the color image.

A print head with a multi-color print ribbon can be used when performing multi-color printing on substrates such as plastic cards, passport pages, and retransfer films. The multi-color print ribbon can include a plurality of panels of CMYK. A controller can be operably coupled to the print head to control operation of the print head. In one embodiment, the scanning process can be performed by a controller. The scanning process can generate a color image that is equivalent to the source image with all the grey pixels extracted (for example, filled with white pixels), and a monochrome image that is equivalent to the source image with all the color pixels extracted (for example, filled with white pixels). In one embodiment, the controller send the generated color image and the generated monochrome image to the plastic card printer with two separate function calls to specify which ribbon panels to use for image rendering (CMY for the color image or K for the monochrome image).

Figure 1B:
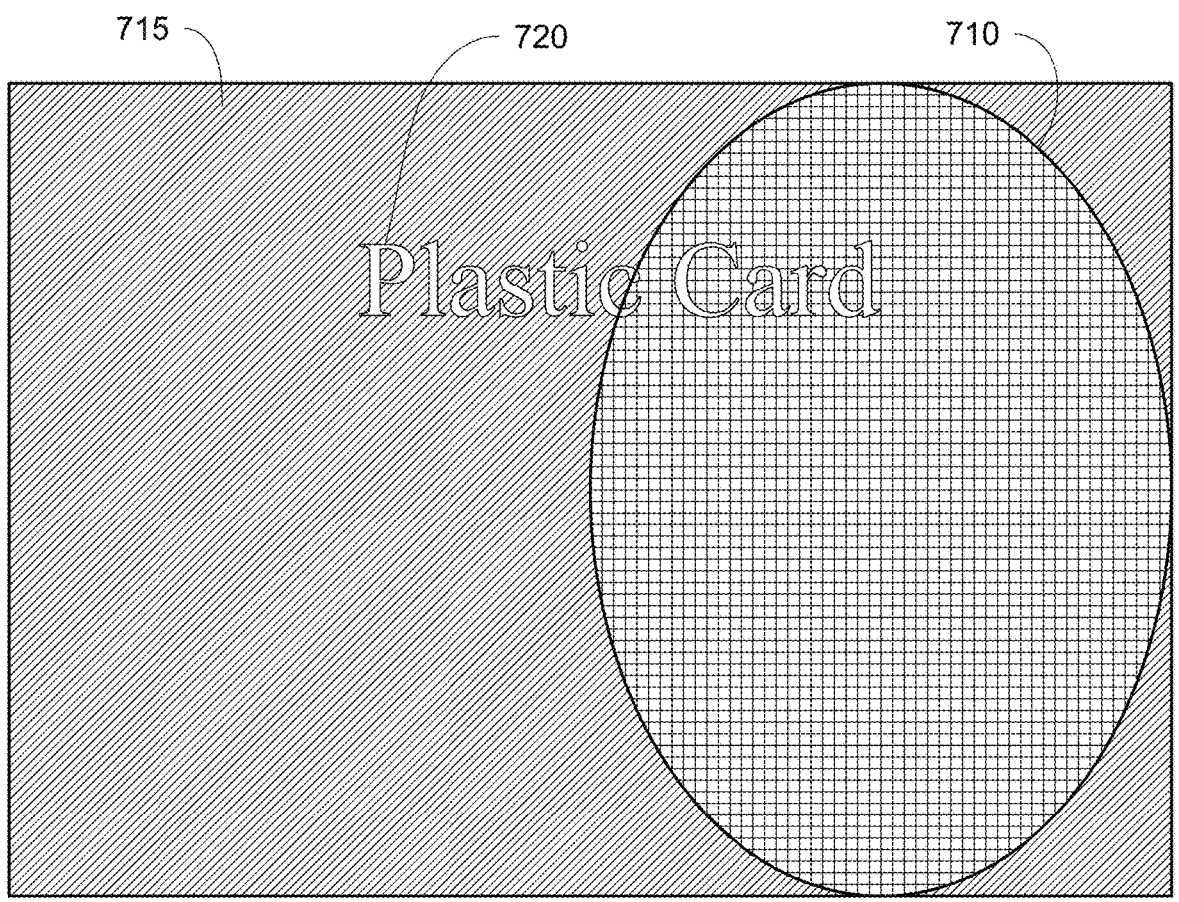
FIG. 1B illustrates a source digital image containing grey areas and color areas as described herein.

FIG. 1A illustrates a source image containing grey and color pixels represented by cells. As shown in FIG. 1A, the source image is represented by 5×5 cells. Each cell represents a pixel. The solid shading cells 700 represent grey pixels. The grid shading cells 705 represent color pixels. FIG. 1B illustrates a source image containing grey and color areas. In FIG. 1B, the ellipse-shaped logo 710 is in color, other areas (such as the background 715 and the text "Plastic Card" 720) are white, grey, or black.

Figure 1C:
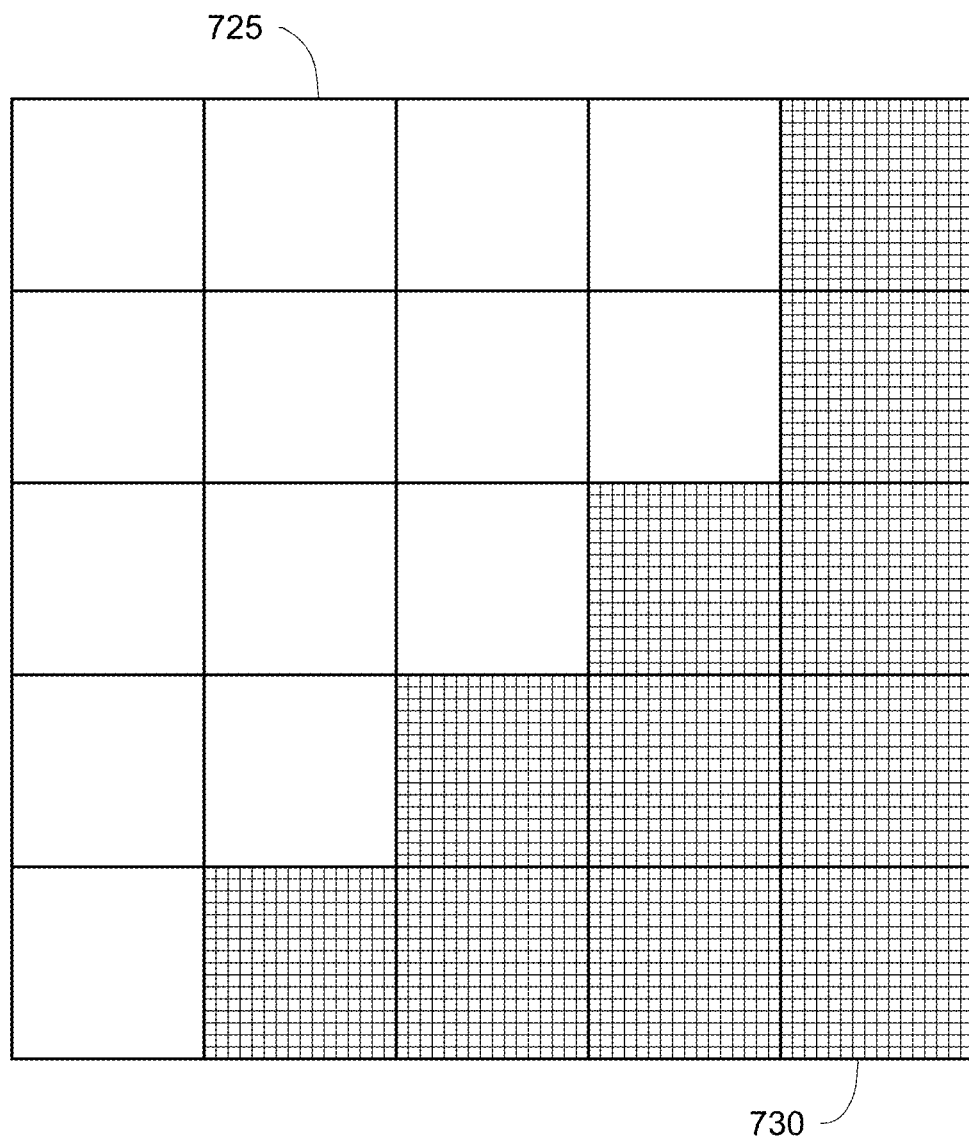
FIG. 1C illustrates a generated color digital image resulting from FIG. 1A with all grey pixels of the source digital image in FIG. 1A being extracted using a pixel extraction process described herein.
Figure 1D:
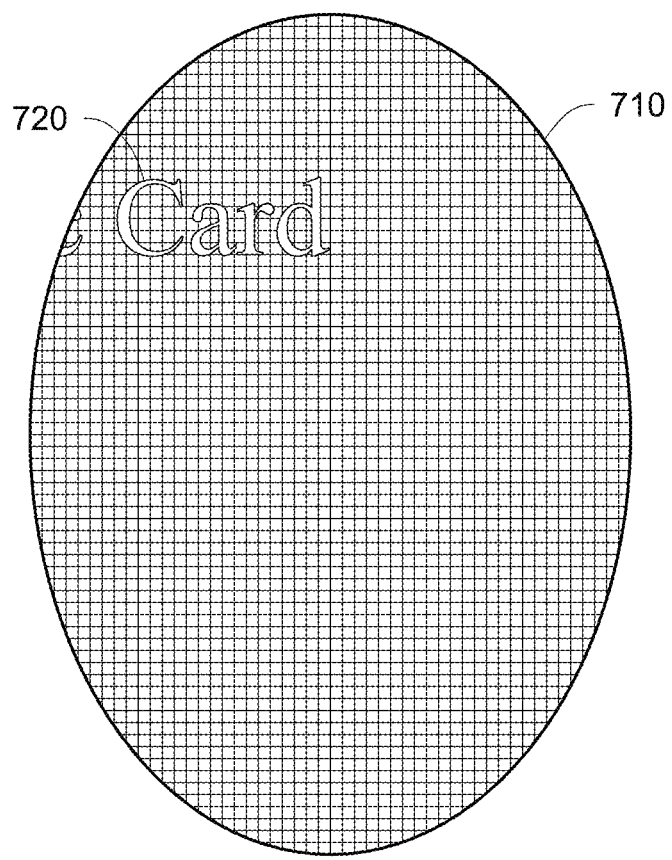
FIG. 1D illustrates a generated color digital image resulting from FIG. 1B with all grey pixels of the source digital image in FIG. 1B being extracted using the pixel extraction process described herein.

FIG. 1C illustrates a generated color image with all grey pixels of the source image in FIG. 1A being extracted. In FIG. 1C, cells 725 are white. The grid shading cells 730 represent color pixels. FIG. 1D illustrates a generated color image with all grey pixels of the source image in FIG. 1B being extracted. In FIG. 1D, the ellipse-shaped logo 710 is in color, the text 720 is white.

Figure 1E:
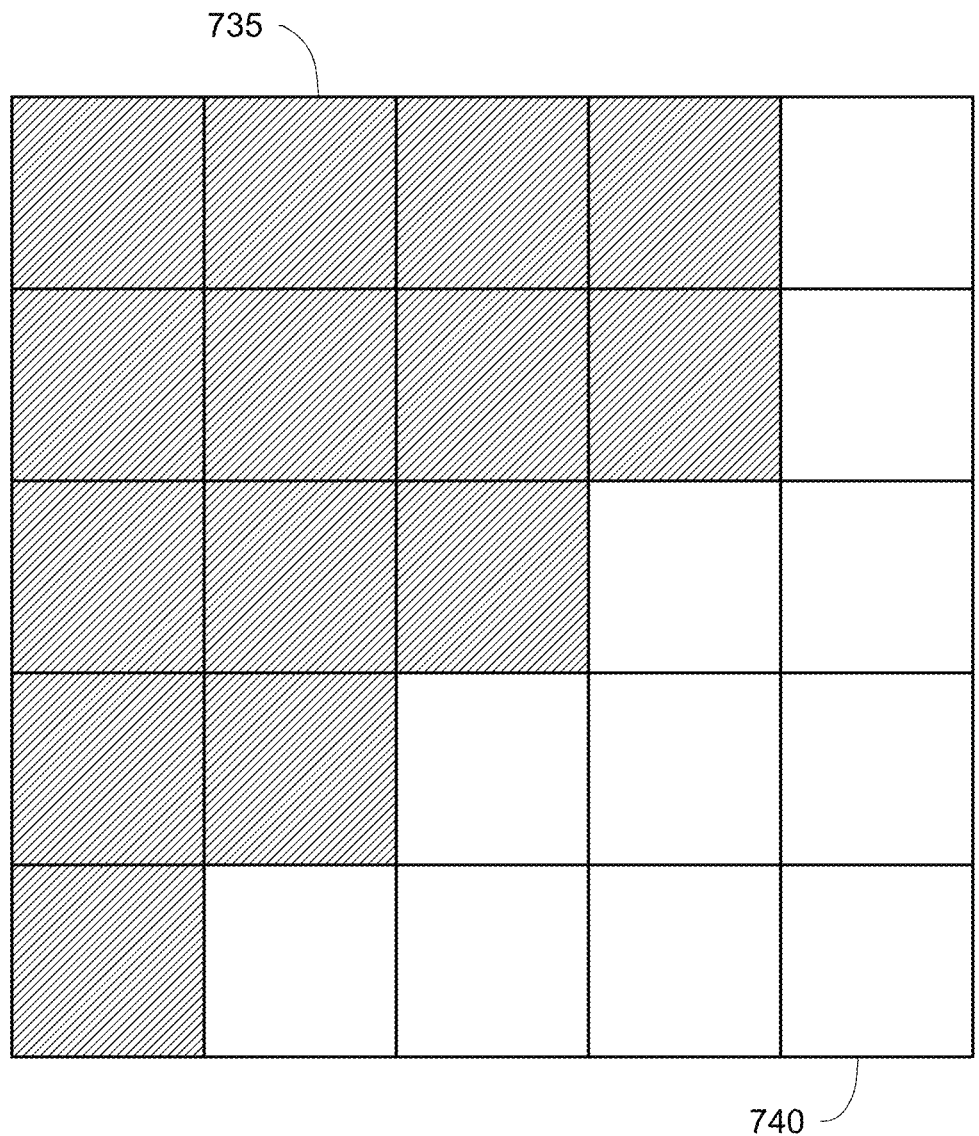
FIG. 1E illustrates a generated monochrome digital image resulting from FIG. 1A with all color pixels of the source digital image in FIG. 1A being extracted using the pixel extraction process described herein.
Figure 1F:
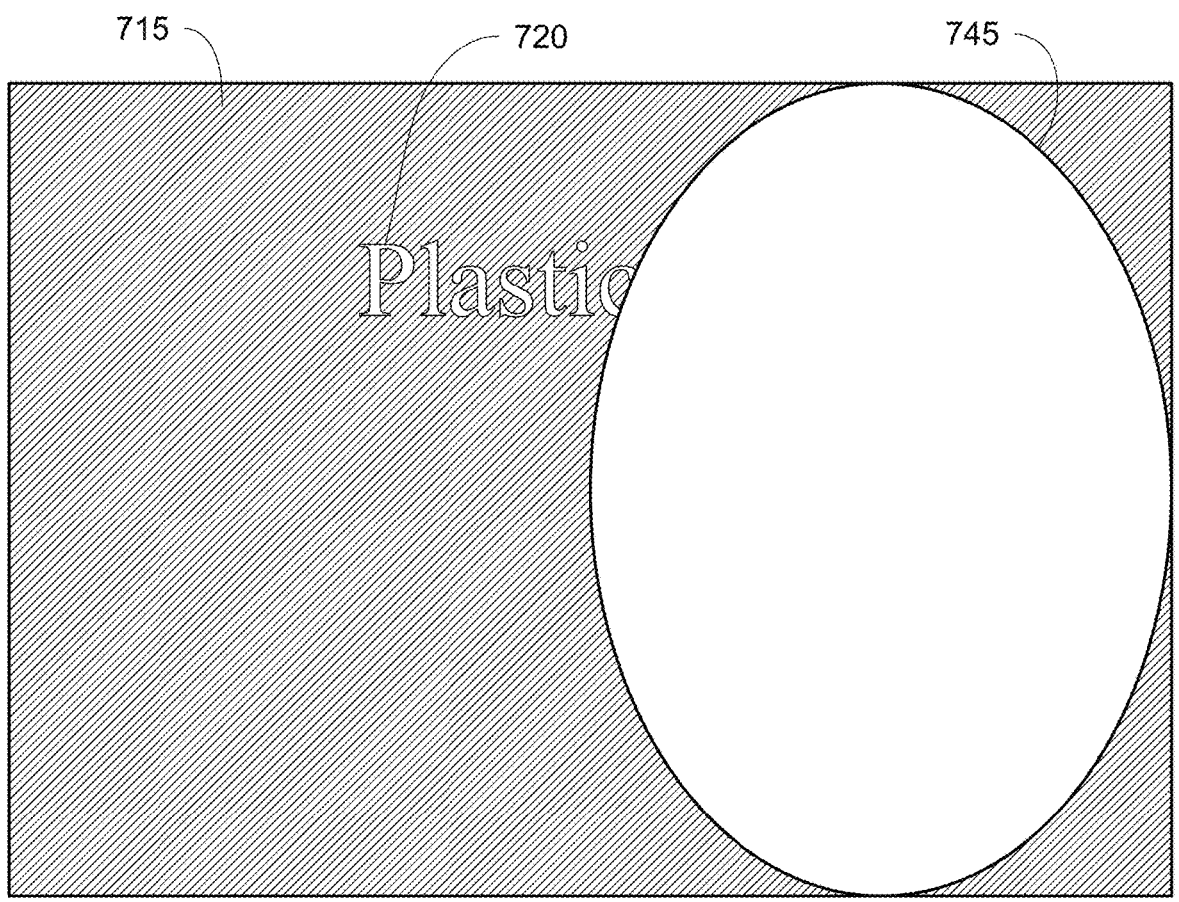
FIG. 1F illustrates a generated monochrome digital image resulting from FIG. 1B with all color pixels of the source digital image in FIG. 1B being extracted using the pixel extraction process described herein.

FIG. 1E illustrates a generated monochrome image with all color pixels of the source image in FIG. 1A being extracted. In FIG. 1E, the solid shading cells 735 represent grey pixels. Cells 740 are white. FIG. 1F illustrates a generated monochrome image with all color pixels of the source image in FIG. 1B being extracted. In FIG. 1B, the ellipse-shaped logo is extracted (shown as 745 in white), and other areas (such as the background 715 and the text 720) are white, grey, or black.

Print trapping can be defined as a process to create an overlap of pixels between the color image and the monochrome image which allows for some variance in the printer registration and avoids gaps between CMY and K regions. When generating the color image and the monochrome image, pixels of the color and monochrome images are aligned such that each pixel has a non-white RGB value in one image or in the other image, but not in both images. In such case, minor registration variance (misregistration) can result in creating areas in which the card substrate shows through.

Figure 2A:
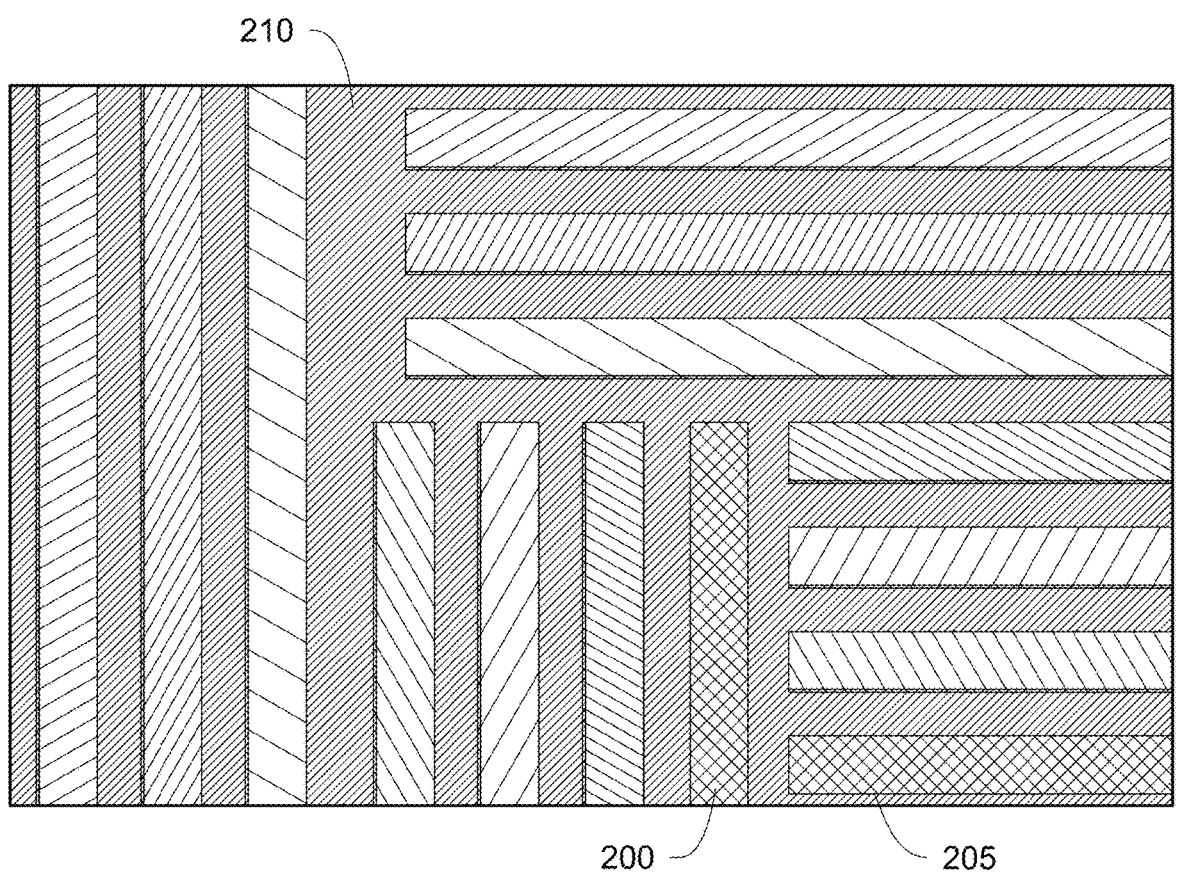
FIG. 2A illustrates a source digital image with registration variance to demonstrate the need for print trapping.
Figure 2B:
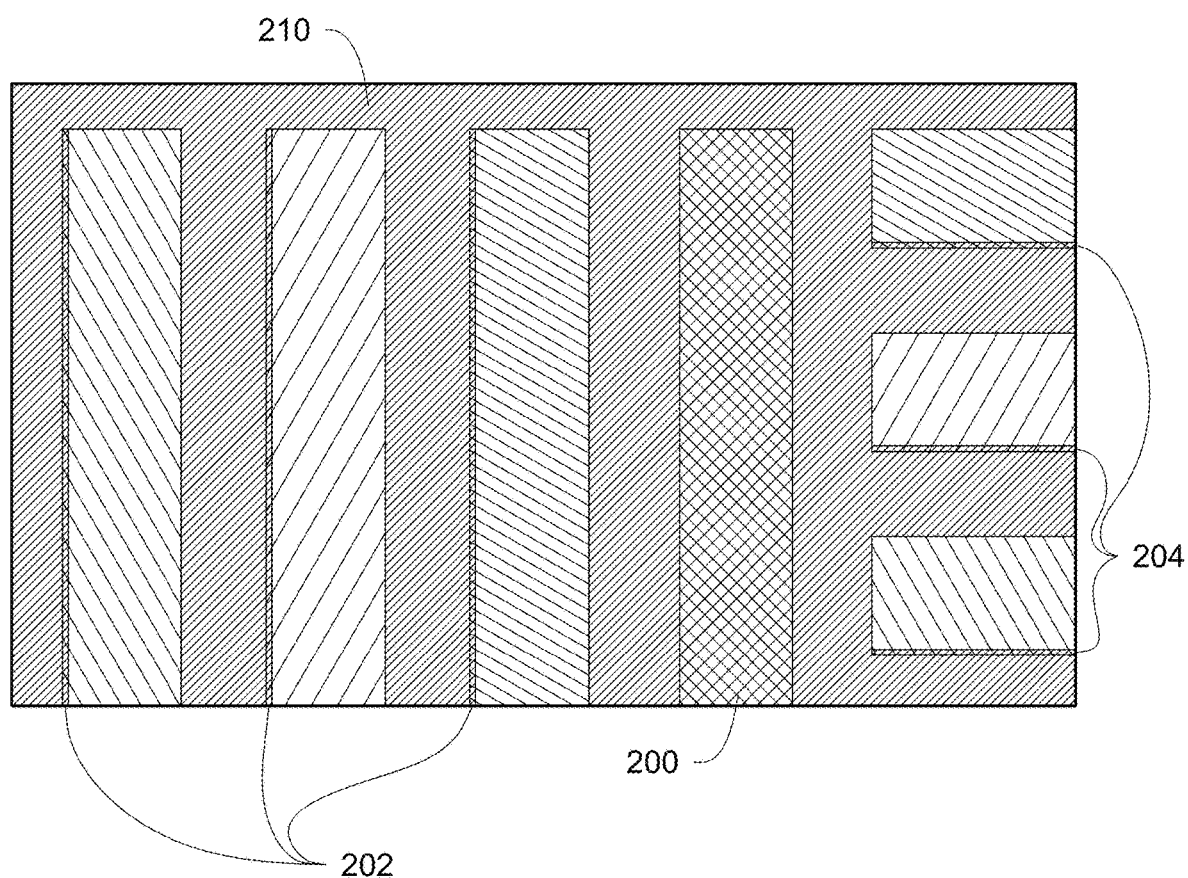
FIG. 2B is an enlarged view of a portion of FIG. 2A to better illustrate the registration variance.

In color printing, registration typically refers to a method of correlating overlapping colors on one single image. When printing an image that has more than one color, it is necessary to print each color separately and ensure each color overlaps the others precisely. Otherwise, the finished image will look fuzzy, blurred, or "out of register". To help line the colors up correctly, a system of registration is necessary. There can be different styles and types of registration, many of which can employ the alignment of specific marks. However, practically, minor registration variance of the printer ribbon panels may still exist. FIG. 2A illustrates a source image with registration variance. In FIG. 2A, the background 210 is black, the rightmost vertical bar 200 and the bottom horizontal bar 205 are grey, and the rest vertical bars and horizontal bars are in different colors (shown in black and/or grey) and are out of register at the edges of the vertical/horizontal bars (see also FIG. 2B). FIG. 2B is an enlarged view of a portion of FIG. 2A. In FIG. 2B, the background 210 is black, the rightmost vertical bar 200 is grey, and the rest vertical bars and horizontal bars are in different colors (shown in black and/or grey). The edges 202 of the color vertical bars and the edges 204 of the color horizontal bars show that the edges of the vertical/horizontal color bars are blur (out of register).

Therefore, when printing the generated color and monochrome images, there might be limitations because of the requirements of pixel-perfect registration of the printer ribbon and application of the CMY and K panels. To compensate for the minor registration variance of the printer ribbon panels, the technique of print trapping can be applied to the color and/or monochrome images.

In one embodiment, during the scanning of the source image, each of the detected grey pixels of the source image is further evaluated or checked. If there is/are neighboring color pixel(s) in the source image to the grey pixel, the grey pixel is added to the color image at the equivalent coordinates with respect to the source image. If there is/are no neighboring color pixel(s) in the source image to the grey pixel, nothing needs to be done (i.e., the grey pixel is extracted from the color image).

Similarly, during the scanning of the source image, each of the detected color (non-grey) pixels of the source image is further evaluated or checked. If there is/are neighboring grey pixel(s) in the source image to the color pixel, the color pixel is replaced with a grey pixel (or converted to a grey pixel) and added to the monochrome image at the equivalent coordinates with respect to the source image. If there is/are no neighboring grey pixel(s) in the source image to the color pixel, nothing needs to be done (i.e., the color pixel is extracted from the monochrome image).

In such embodiment, the process of checking neighboring color/grey pixel(s) and adding grey pixel(s) to the color and/or monochrome image(s) if neighboring color/grey pixel(s) is/are found is defined as print trapping. Print trapping can create an overlap of pixels between the color image and the monochrome image which allows for some variance in the printer registration and avoids gaps between CMY and K regions. Methods and systems described herein scan all pixels in the source color image and inspect neighboring pixels to determine whether print trapping should occur.

Figure 2C:
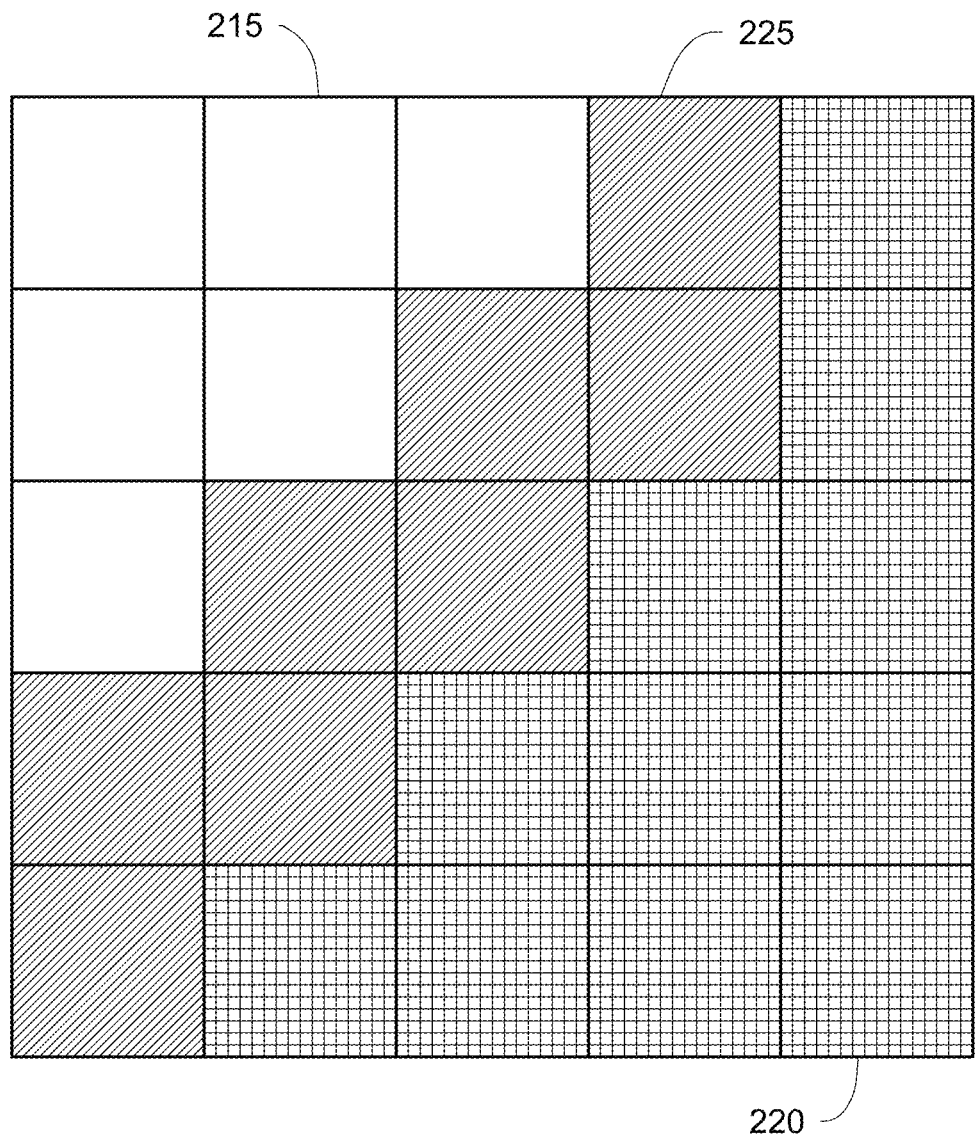
FIG. 2C illustrates a generated color image (represented by cells) with print trapping applied as described herein.
Figure 2D:
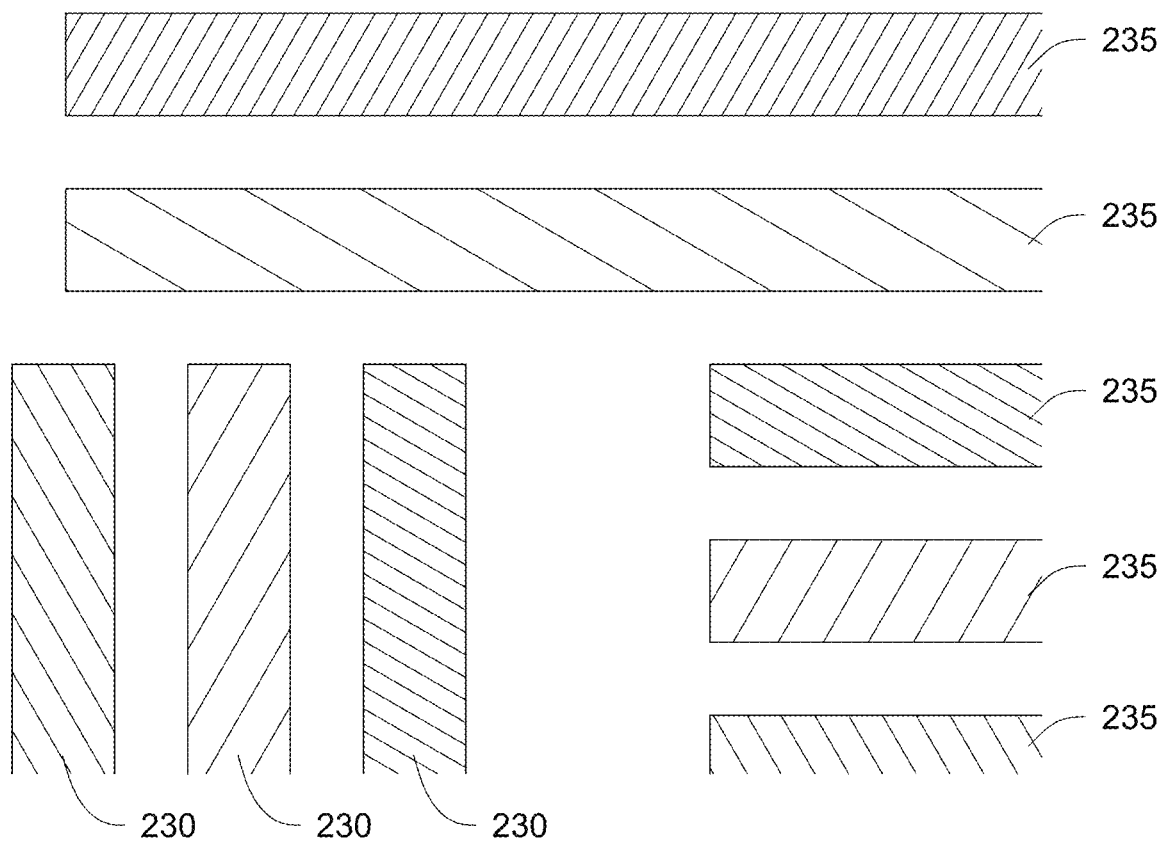
FIG. 2D illustrates a generated color digital image (based on the source digital image in FIG. 2A) with print trapping as described herein applied.
Figure 2E:
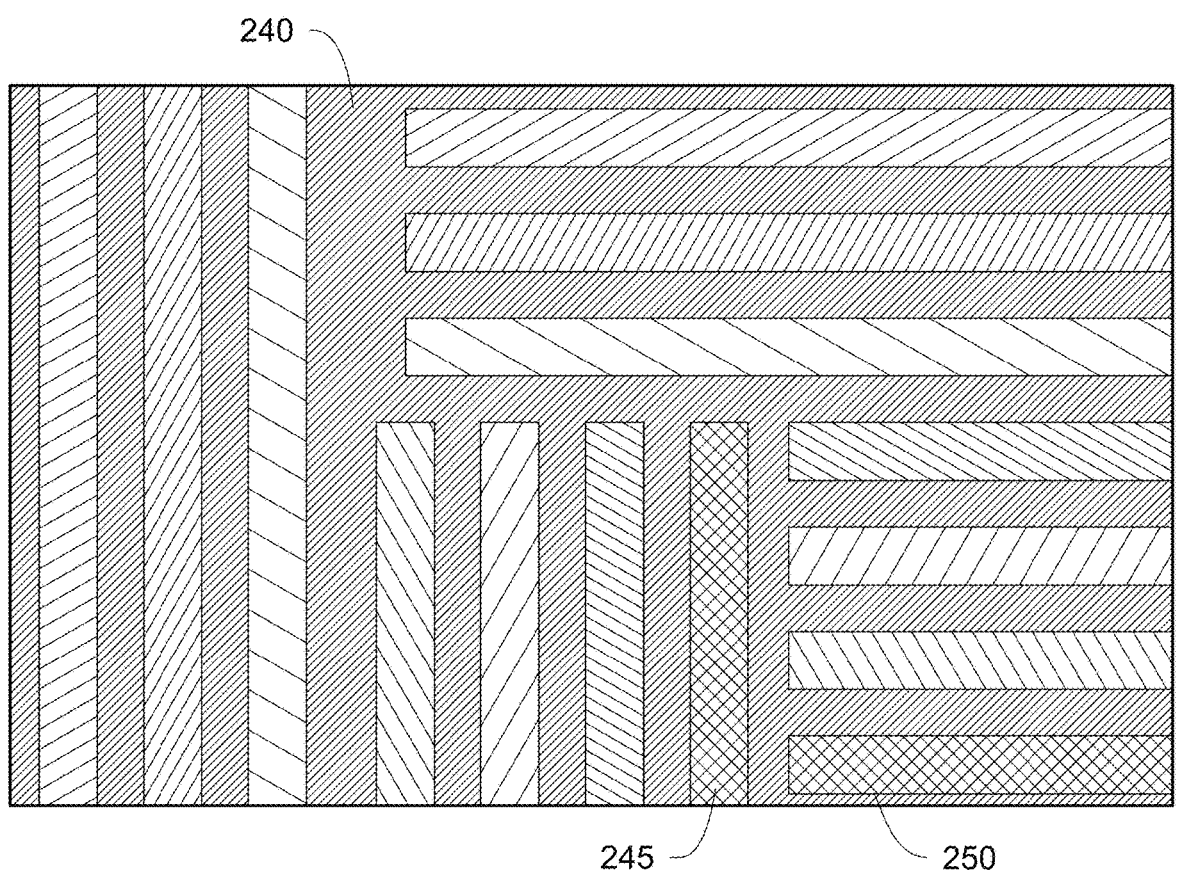
FIG. 2E illustrates a final printed image based on the generated color digital image of FIG. 2D and a generated monochrome digital image based on the source digital image in FIG. 2A, with print trapping as described herein applied.
Figure 2F:
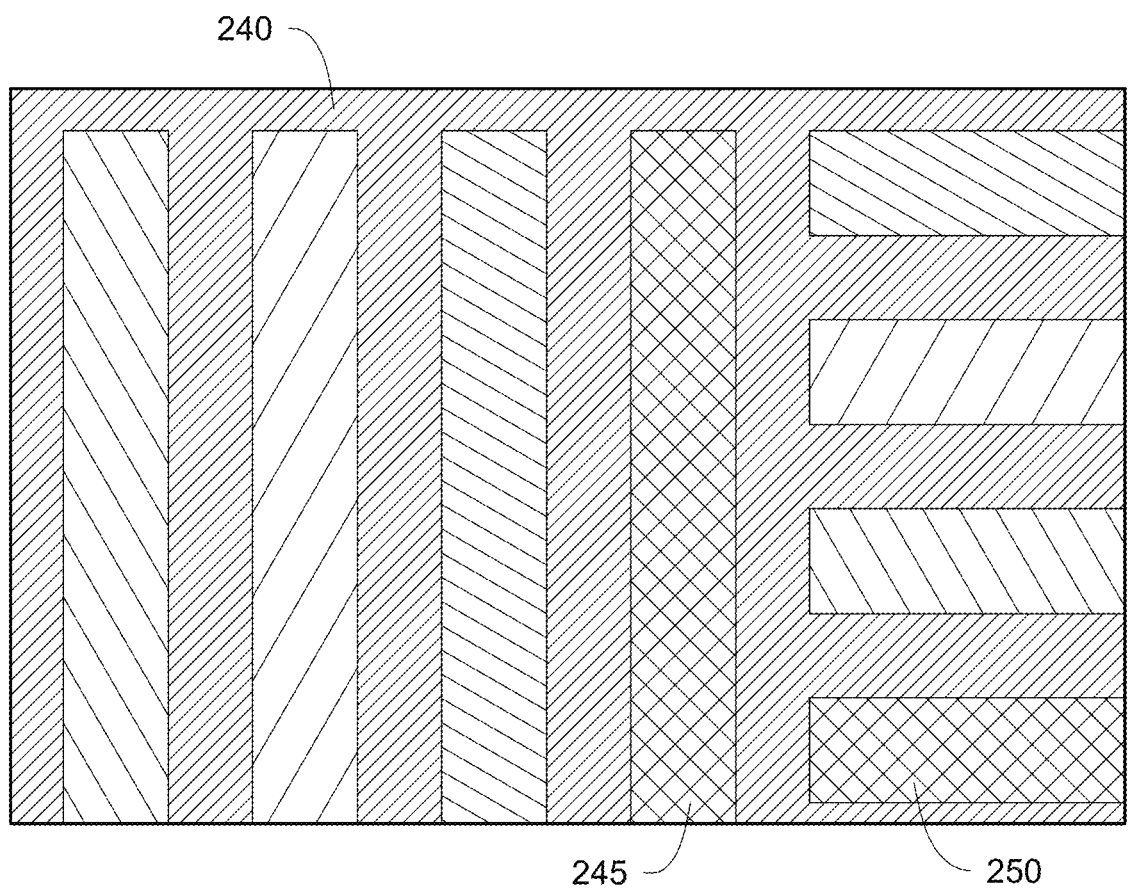
FIG. 2F is an enlarged view of a portion of FIG. 2E.

FIG. 2C illustrates a generated color image (represented by cells) with print trapping. In FIG. 2C, cells 215 are white. Those grey pixels 225 (represented by solid shading) that have neighboring color pixel(s) in the source image are added into the color image at the equivalent coordinates with respect to the source image. The grid shading cells 220 represent color pixels. FIG. 2D illustrates a generated color image (based on the source image FIG. 2A) with print trapping. All of the vertical bars 230 and horizontal bars 235 in FIG. 2D are in different colors (shown in black and/or grey). FIG. 2E illustrates a final printed result based on the generated color image of FIG. 2D and a generated monochrome image based on the source image FIG. 2A. In FIG. 2E, the background 240 is black, the rightmost vertical bar 245 and the bottom horizontal bar 250 are grey, and the rest vertical bars and horizontal bars are in different colors (shown in black and/or grey). FIG. 2F is a enlarge view of portion of FIG. 2E. In FIG. 2F, the background 240 is black, the rightmost vertical bar 245 and the bottom horizontal bar 250 are grey, and the rest vertical bars and horizontal bars are in different colors (shown in black and/or grey).

Figure 2G:
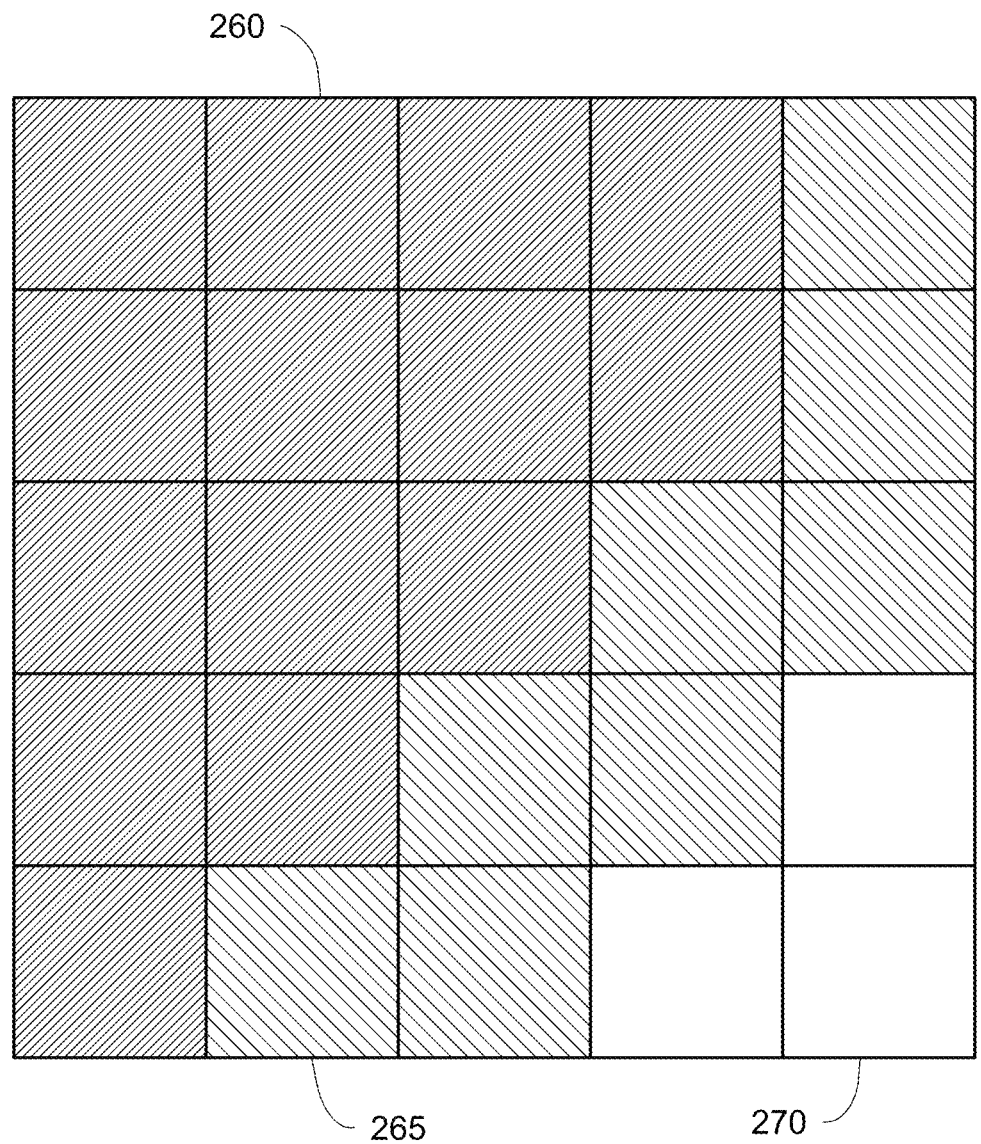
FIG. 2G illustrates a generated monochrome digital image (represented by cells) with print trapping as described herein applied.

FIG. 2G illustrates a generated monochrome image (represented by cells) with print trapping, according to one embodiment. In FIG. 2G, cells 270 are white. Cells 260 (with solid shading) are grey pixels. Those color pixels (at the locations of cells 265) that have neighboring grey pixel(s) in the source image are replaced with grey pixels 265 (or converted with grey pixels, and a gradient is applied, which is described in the following sections) and added into the monochrome image at the equivalent coordinates with respect to the source image. The grey pixels with gradient applied are represented by the cells 265 with down diagonal shading.

With print trapping, the color image and the monochrome image have overlapping pixels. The overlapping pixels can allow for minor registration variance and avoid areas in which the card substrate shows through.

As shown in FIG. 2G, those color pixels (at the locations of cells 265) that have neighboring grey pixel(s) in the source image are replaced with grey pixels 265 with gradient applied and added into the monochrome image. In addition to the gradient, when preforming print trapping, some other parameters can be used. The parameters for printing trapping includes (1) the direction pixel spread is applied, (2) the depth of pixel spread desired, and/or (3) the desire to apply a gradient to spread pixels which fade to white the further from the color/monochrome edge.

In print trapping, grey pixels are added into the otherwise (grey/color) extracted area in the color and/or monochrome images when neighboring color/grey pixel(s) is/are found. This process of adding the grey pixels (when neighboring color/grey pixel(s) is/are found) can be defined as pixel spread. Pixel spread can have direction and depth. As shown in FIG. 2C, pixel spread is to the left direction. In FIG. 2G, pixel spread is to the right direction. In FIGS. 2C and 2G, the depth (which is described in the following sections) of pixel spread is one. During printing setup, a user can select which direction pixels will spread into an otherwise (grey/color) extracted area and the depth of pixel spread.

Figure 3A:
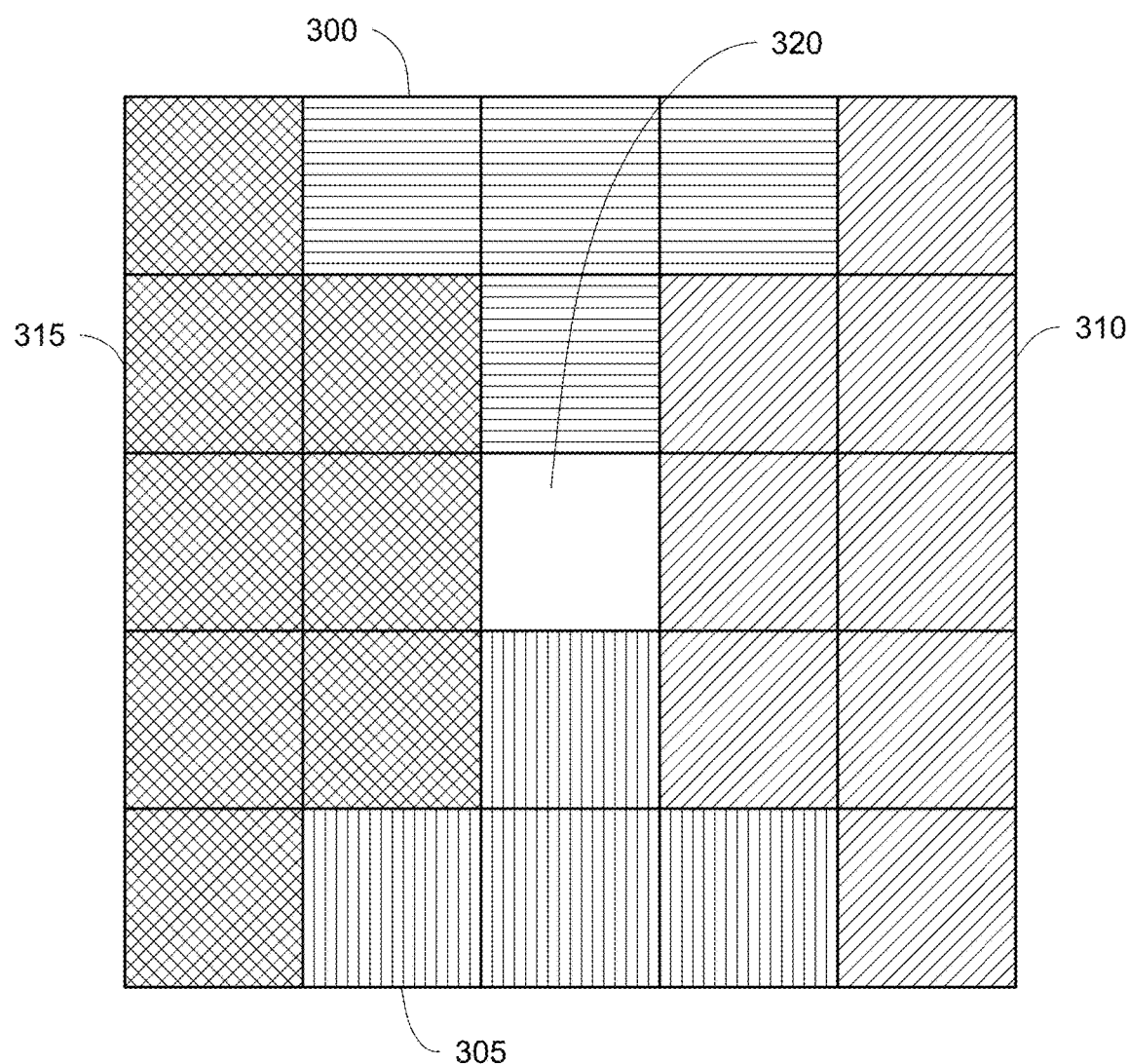
FIG. 3A illustrates the concept of pixel spread used in the print trapping described herein.

FIG. 3A illustrates the directions for detecting neighboring pixels, according to one embodiment. As shown in FIG. 3A, the 5×5 cells represent four different directions for detecting neighboring pixels (details will be described later, see FIGS. 5 and 6). The middle pixel 320 is the control pixel (shown as white for demonstration only) and represents the pixel being evaluated for print trapping (i.e. whether to render the control pixel on the color image or the monochrome image). For example, if the middle pixel 320 is a gray pixel, the neighboring pixels are inspected to determine if there is an adjacent color pixel. The actual pixel cells that are inspected are determined from which direction pixel spread is desired. The cells 300 (4 at the top) with horizontal shading represent neighboring pixels above the control pixel and can result in a down direction of pixel spread when the neighboring pixels are not targeting the same color or monochrome image (e.g. the control pixel is a grey pixel and the neighboring pixel is a color pixel). Similarly, the cells 305 (4 at the bottom) with vertical shading represent an up direction of pixel spread. The cells 315 (7 at the left) with trellis shading represent a right direction of pixel spread. The cells 310 (7 at the right) with up diagonal shading represent a left direction of pixel spread.

During the process of scanning the source image and generating the color image, when a grey pixel of the source image is detected during the scanning process, a color pixel within one or more of the four directions (up, down, left, and/or right, which can be chosen in the printing setup) of the detected grey pixel (which can be the control pixel as shown in FIG. 3A) is searched. If a color pixel is found in the predetermined direction(s), the grey pixel (the control pixel) is added to the color image at the equivalent coordinates with respect to the source image. If no color pixel is found in the predetermined direction(s), nothing needs to be done. The direction(s) of pixel spread can provide ability to constrain print trapping to a particular direction (or particular directions).

Similarly, during the process of scanning the source image and generating the monochrome image, when a color pixel of the source image is detected during the scanning process, a grey pixel within one or more of the four directions (up, down, left, and/or right, which can be chosen in the printing setup) of the detected color pixel (which can be the control pixel as shown in FIG. 3A) is searched. If a grey pixel is found in the predetermined direction(s), the color pixel (the control pixel) is replaced with a grey pixel (or converted to a grey pixel) and added to the monochrome image at the equivalent coordinates with respect to the source image. If no grey pixel is found in the predetermined direction(s), nothing needs to be done.

It will be appreciated that print trapping can apply to the color image only, to the monochrome image only, or to both color and monochrome images. A user can configure the options during printing setup.

Figure 3B:
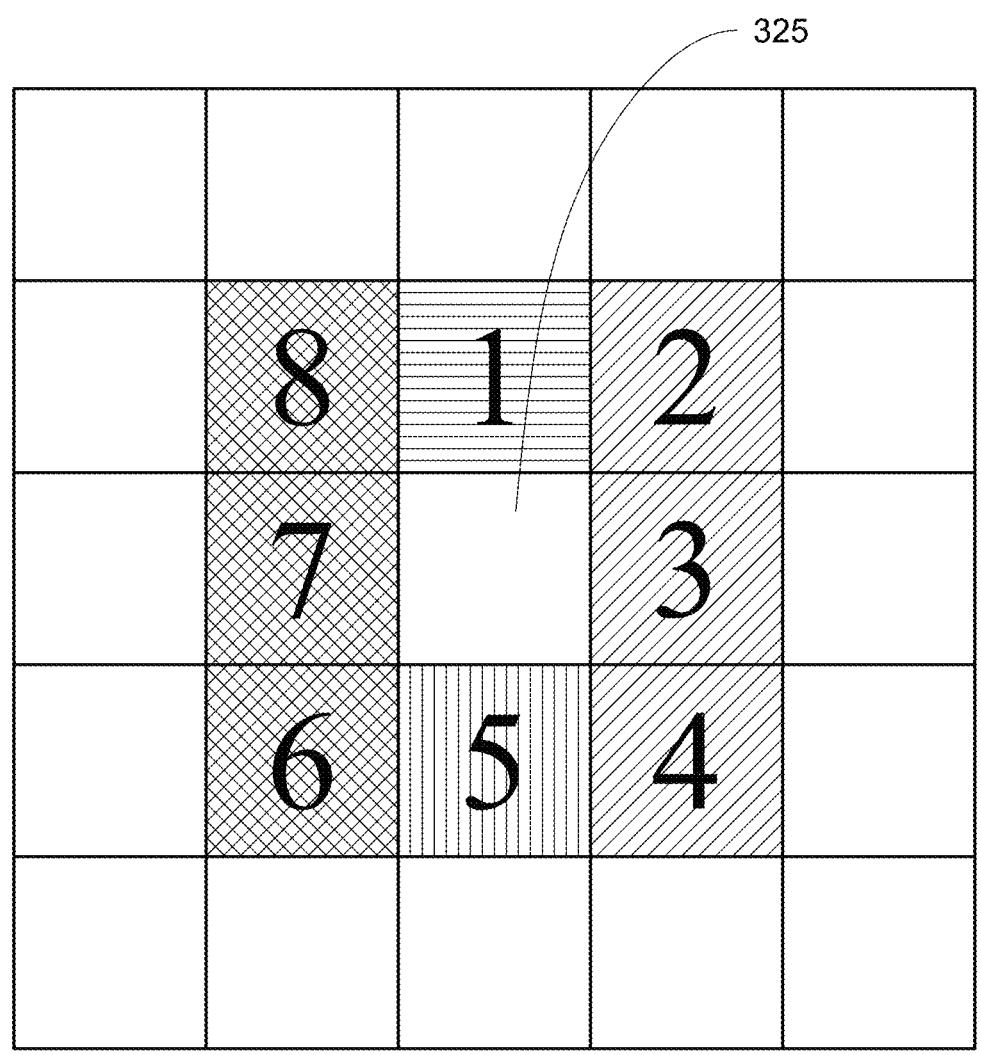
FIG. 3B illustrates an example of a possible pixel evaluation order in the print trapping described herein.

FIG. 3B illustrates the pixel spread with a depth of one, according to one embodiment. As shown in FIG. 3B, the pixel spread in any particular direction (up, down, left, and/or right) has a depth of one. The depth of pixel spread is defined as how many levels of neighboring pixels of the middle control pixel 325 are to be checked in a particular direction. For example, as shown in FIG. 3B, in the up direction for detecting neighboring pixels (i.e., down direction for pixel spread), one level of pixel(s) is checked with respect to the middle control pixel 325. The total pixels checked in the one level (in the up direction for detecting neighboring pixels) are one (marked as "1" in FIG. 3B). Similarly, in the down direction for detecting neighboring pixels (i.e., up direction for pixel spread), one level of pixel(s) is checked with respect to the middle control pixel 325. The total pixels checked in the one level (in the down direction for detecting neighboring pixels) are one (marked as "5" in FIG. 3B). In the left direction for detecting neighboring pixels (i.e., right direction for pixel spread), one level of pixel(s) is checked with respect to the middle control pixel 325. The total pixels checked in the one level (in the left direction for detecting neighboring pixels) are three (marked as "6", "7", and "8" in FIG. 3B). In the right direction for detecting neighboring pixels (i.e., left direction for pixel spread), one level of pixel(s) is checked with respect to the middle control pixel 325. The total pixels checked in the one level (in the right direction for detecting neighboring pixels) are three (marked as "2", "3", and "4" in FIG. 3B). A user can configure the depth of pixel spread in the printing setup.

Figure 3C:
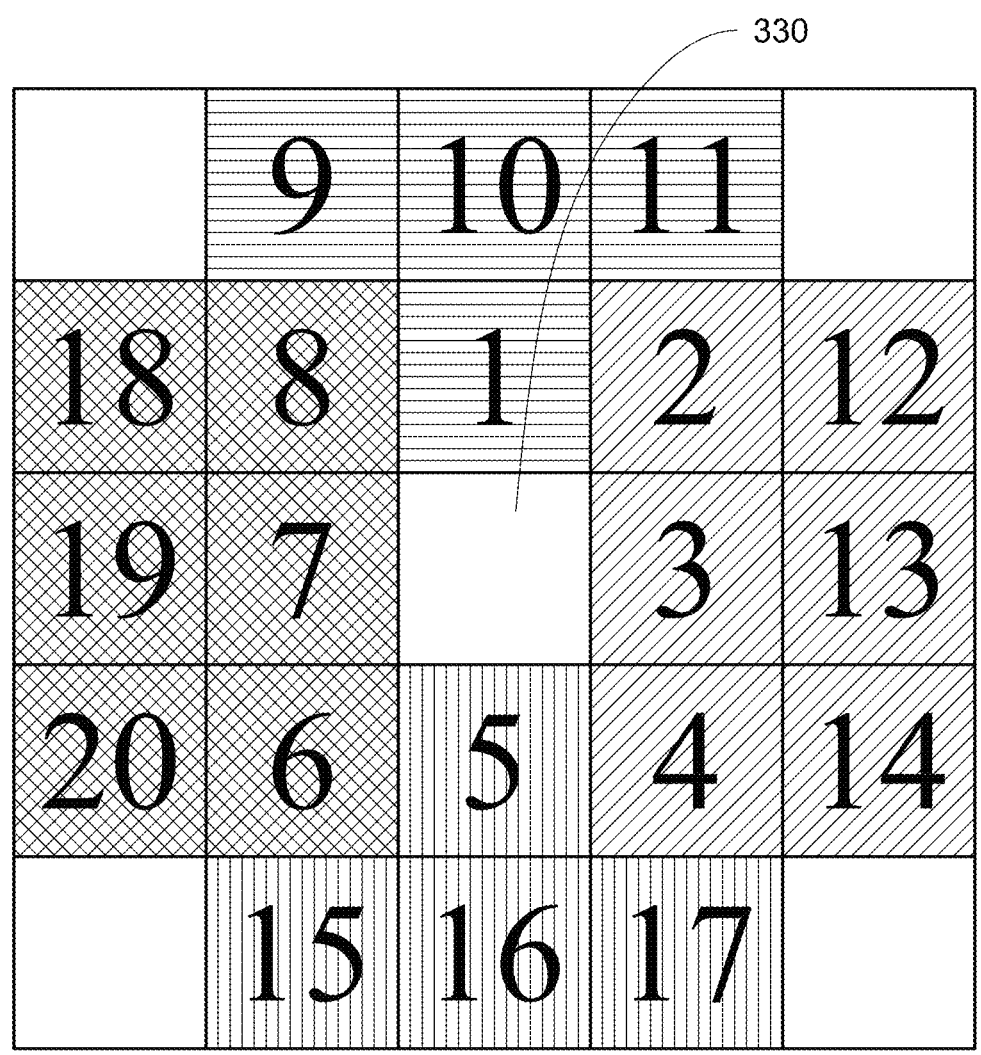
FIG. 3C illustrates an example of a possible continuation of the pixel evaluation order of FIG. 3B.

FIG. 3C illustrates the pixel spread with a depth of two, according to one embodiment. As shown in FIG. 3C, the pixel spread in any particular direction (up, down, left, and/or right) has a depth of two. For example, as shown in FIG. 3C, in the up direction for detecting neighboring pixels, two levels of pixel(s) are checked with respect to the middle control pixel 330. The total pixels checked in the two levels (in the up direction for detecting neighboring pixels) are four (marked as "1", "9", "10", and "11" in FIG. 3C). Similarly, in the down direction for detecting neighboring pixels, two levels of pixel(s) are checked with respect to the middle control pixel 330. The total pixels checked in the two levels (in the down direction for detecting neighboring pixels) are four (marked as "5", "15", "16", and "17" in FIG. 3C). In the left direction for detecting neighboring pixels, two levels of pixel(s) are checked with respect to the middle control pixel 330. The total pixels checked in the two levels (in the left direction for detecting neighboring pixels) are six (marked as "6", "7", "8", "18", "19", and "20" in FIG. 3C). In the right direction for detecting neighboring pixels, two levels of pixel(s) are checked with respect to the middle control pixel 330. The total pixels checked in the two levels (in the right direction for detecting neighboring pixels) are six (marked as "2", "3", "4", "12", "13", and "14" in FIG. 3C).

Figure 3D:
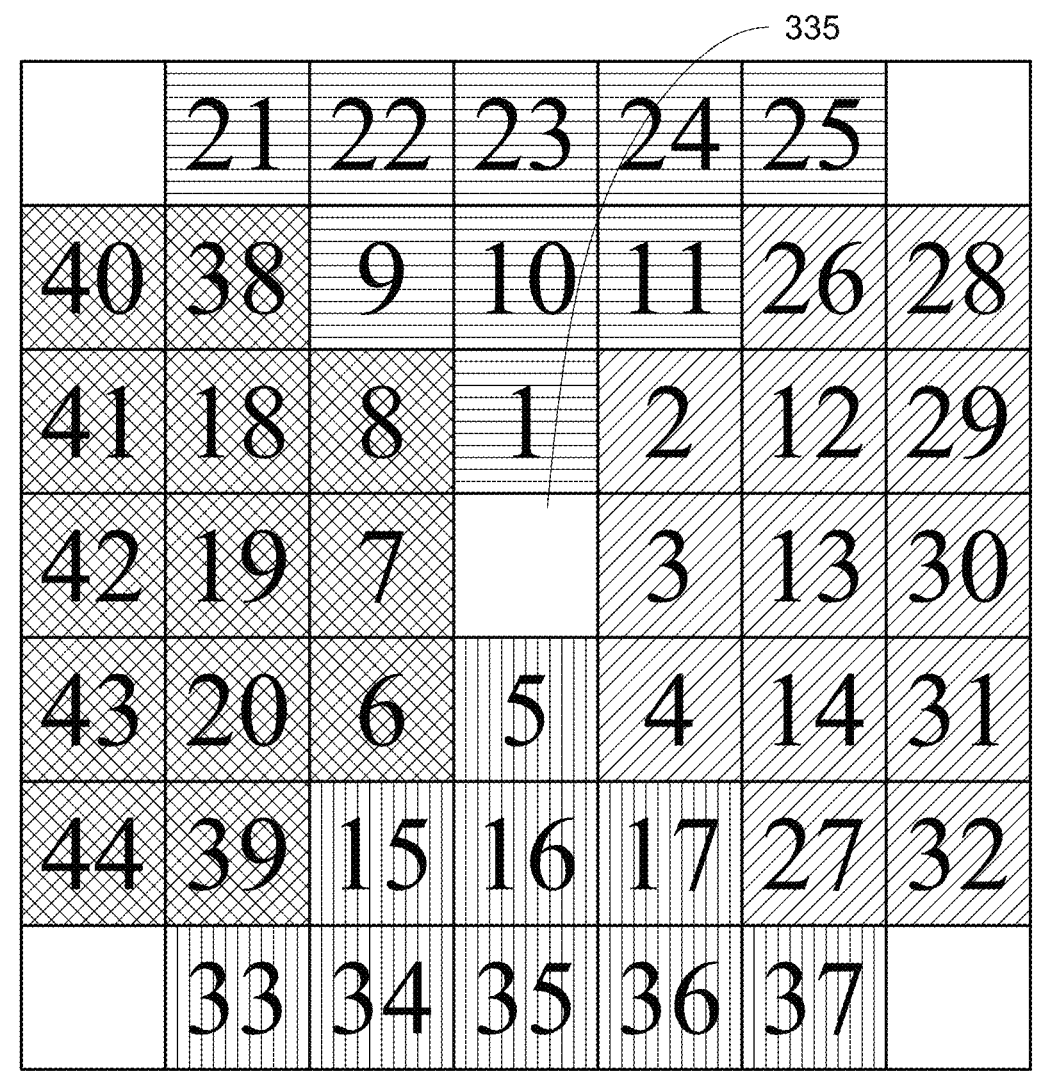

FIG. 3D illustrates the pixel spread with a depth of three, according to one embodiment. As shown in FIG. 3D, the pixel spread in any particular direction (up, down, left, and/or right) has a depth of three. For example, as shown in FIG. 3D, in the up direction for detecting neighboring pixels, three levels of pixel(s) are checked with respect to the middle control pixel 335. The total pixels checked in the three levels (in the up direction for detecting neighboring pixels) are nine (marked as "1", "9"-"11" and "21"-"25" in FIG. 3D). Similarly, in the down direction for detecting neighboring pixels, three levels of pixel(s) are checked with respect to the middle control pixel 335. The total pixels checked in the three levels (in the down direction for detecting neighboring pixels) are nine (marked as "5", "15"-"17" and "33"-"37" in FIG. 3D). In the left direction for detecting neighboring pixels, three levels of pixel(s) are checked with respect to the middle control pixel 335. The total pixels checked in the three levels (in the left direction for detecting neighboring pixels) are 13 (marked as "6"-"8", "18"-"20" and "38"-"44" in FIG. 3D). In the right direction for detecting neighboring pixels, three levels of pixel(s) are checked with respect to the middle control pixel 335. The total pixels checked in the three levels (in the right direction for detecting neighboring pixels) are 13 (marked as "2"-"4", "12"-"14" and "26"-"32" in FIG. 3D).

During the process of scanning the source image and generating the color and/or monochrome images, methods and systems described herein can evaluate the detected control pixel (grey pixel for the color image and color pixel for the monochrome image) and search the neighboring pixels within the predetermined direction and depth of the pixel spread. The searching order of the neighboring pixels is noted by the value in the cells (for example, 1-44 in FIG. 3D) and is dependent on which quadrant/direction(s) and depth of pixel spread the printing setup is configured to inspect. For example, if only "up" direction for detecting neighboring pixels (or "down" direction for pixel spread) is configured to inspect and the depth of pixel spread is configured to be three, the neighboring pixels "1", "9"-"11" and "21"-"25" of the detected control pixel are checked.

It will be appreciated that when the depth of pixel spread is configured to be greater than one, the number of neighboring pixel to be checked increases compared with the number of neighboring pixel to be checked when the depth of pixel spread is configured to be one. The greater the depth, the greater the number of neighboring pixel to be checked is. To simplify the checking process when the depth of pixel spread is configured to be greater than one, if it is determined that the middle control pixel is surrounded by all white pixels, the check process can be stopped—the control pixel is not added as a grey pixel to either the color image or the monochrome image.

The generated color image contains all color pixels of the source image and grey pixels added from print trapping process. The monochrome image contains all grey pixels of the source image and grey pixels added from print trapping process. All remaining pixels (not color or grey) for the corresponding color image or monochrome image are rendered with white pixels.

The grey pixels added into the color and/or monochrome images during print trapping (i.e., the spread pixels) can apply a gradient (or called trap gradient). The applied gradient can gradually fade the spread pixels toward white when the spread pixels are further away from the color/monochrome edge. See FIG. 2G for an example where a gradient is applied to the spread pixels. A user can configure the trap gradient in the printing setup.

Applying gradient on spread pixels during print trapping can be defined as blending. Blending can soften the effects of print trapping by reducing the visibility of overlapping area between the color image and the monochrome image.

As discussed before, print trapping can create a pixel overlap between areas of the color and monochrome images. The overlapped area can be noticeable on a printed plastic card. For example, during the print trapping process on a color image, the grey pixels of the source image that have neighboring pixels (in the predetermined pixel spread direction(s) and within the predetermined pixel spread depth) are added into the color image. When generating the monochrome image, all grey pixels of the source image are added into the monochrome image. Thus, in the overlapping area, the grey pixels are on both the color image and the monochrome image. When perform CMYK printing, the color image uses CMY to render all the pixels of the color image (including the grey pixels from print trapping), and the monochrome image uses K to render all the pixels of the monochrome image. Drawing the same pixels (i.e., the overlapping grey pixels) twice can result in an overall darker region on the printed plastic card and the overlapped area can be noticeable.

Methods and system described herein can apply blending during the print trapping process. During the print trapping process on the color image, a user configurable gradient can be applied to the grey pixels (that have neighboring color pixels in the source image) before the grey pixels being added to the color image. Similarly, during the print trapping process on the monochrome image, a user configurable gradient can be applied to the color pixels (that have neighboring grey pixels in the source image) before the color pixels being converted to grey pixels and/or the converted grey pixels being added to the monochrome image. Applying a gradient on a grey pixel transitions the RGB values of the grey pixels towards white (R=255, G=255, B=255).

For a configured pixel spread depth, for example, the depth is 5, different gradients can be apply to different depth (or level) of the spread grey pixels on the color image only, on the monochrome image only, or on both the color and monochrome images. Different gradients applied on the grey pixels can result in different degree of transition of the RGB values of the grey pixels towards white. In one embodiment, different gradients can be applied so that the RGB values of the grey pixels from depth 1 to depth 5 can be gradually transitioned towards white. A user can configure the blending to set up a linear transition, a 'faster' transition, or a 'slower' transition towards white. In one embodiment, the blending option can also be disabled.

Figure 4A:
FIG. 4A illustrates a printed color image without print trapping described herein applied.
Figure 4B:
FIG. 4B illustrates a printed color image similar to FIG. 4A but with the print trapping described herein applied.
Figure 4C:
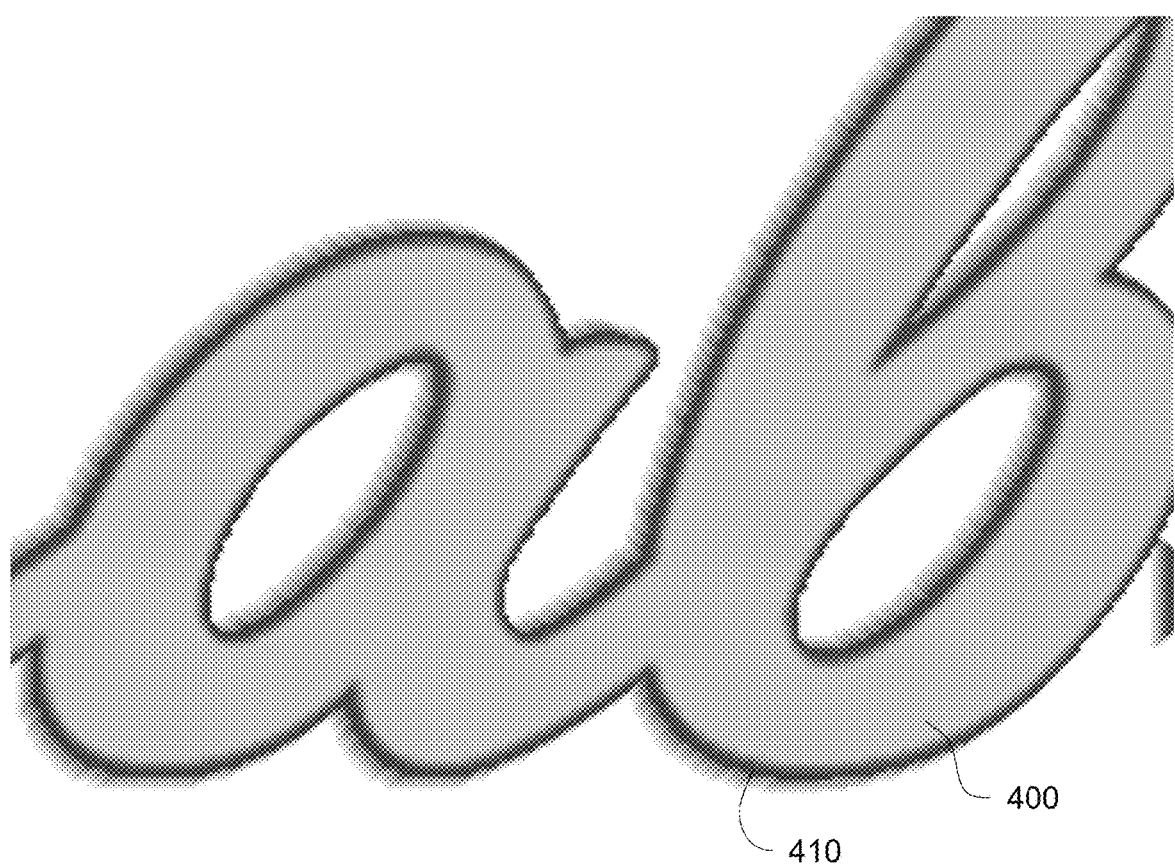
FIG. 4C illustrates a printed color image similar to FIG. 4A but with print trapping and liner blending described herein applied.

FIG. 4A illustrates a generated color image without print trapping. The generated color image contains only color pixels 400 (shown in black and/or grey). FIG. 4B illustrates the color image of FIG. 4A with print trapping and a pixel spread depth of 5, shown in black and/or grey. In FIG. 4B, 400 represent the color pixels, and 405 represent the spread pixels. FIG. 4C illustrates the color image of FIG. 4A with print trapping, liner blending, and a pixel spread depth of 5, shown in black and/or grey. In FIG. 4C, 400 represent the color pixels, and 410 represent the spread pixels with liner blending.

It will be appreciated that print trapping is needed because of inherent registration variance when applying the rendered images to the card substrate. The degree of registration variance may not necessarily be fixed (or constant) between printers or jobs. In one embodiment, print trapping may create overlapping areas to address the worst registration variance scenario. In such embodiment, print trapping may create more overlapping area than needed, and blending can help soften the effect.

In operation, the generated color and monochrome images (for example, after pixel extraction, perceptual grey detection, print trapping, and/or blending) are sent by, for example, the controller, to the plastic card printer with two separate function calls to specify which ribbon panels to use for image rendering (CMY for the color image including any spread grey pixels, or K for the monochrome image).

It will be appreciated that there can be alternative methods to implement the print trapping and/or blending processes. For example, there can be alternative algorithm for detecting neighboring pixels. Regions of the source image can be scanned with multiple sweeps to identify pixel makeup and trapping region. For another example, there can be alternative formulas for greyscale variance value and for color-to-grey conversion. For yet another example, there can be alternative ways for drawing the grey pixel trapping/overlapping region on the color image. An intermediate color pixel rather than composite grey can be used in print trapping on the color image.

Figure 5:
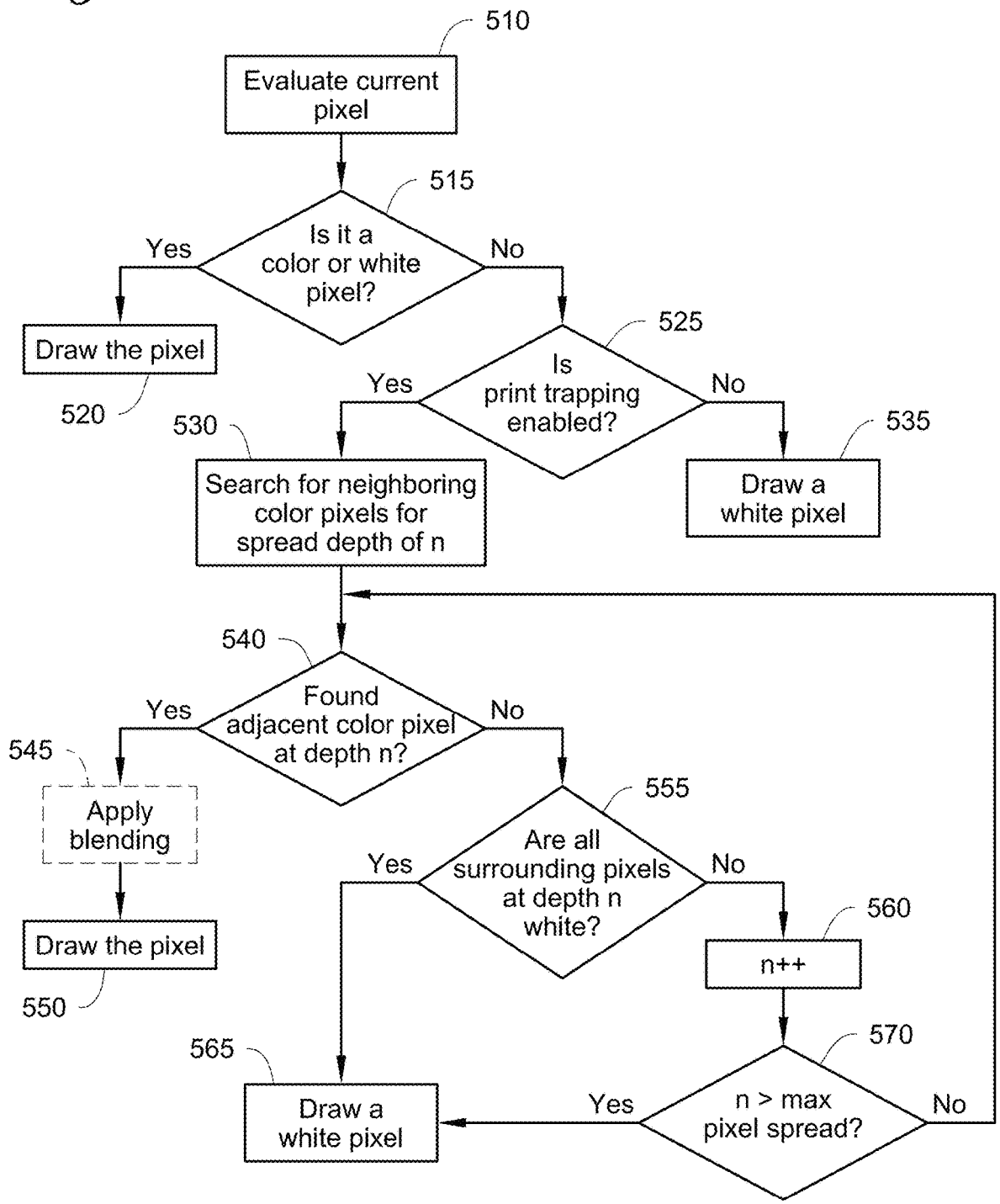
FIG. 5 illustrates a flow chart depicting steps in generating the color digital image from the source digital image.

FIG. 5 illustrates a diagram of generating a color image based on a source image. The processes described in the diagram of FIG. 5 can be performed, for example, by the controller. The processes in FIG. 5 are based off the similar or same processes discussed in the previous sections. The source image is the image that a user would like to print on a plastic card. Methods and systems described herein can achieve the print task/job by generating a color image and a monochrome image based on the source image, using CMYK printing, printing the color image using CMY panels, and printing the monochrome image using K panel.

In one embodiment, the color image can start with an empty image (i.e., having size of 0). When generating the color image, the source image is scanned pixel by pixel. At 510, each pixel of the source image is evaluated based on, for example, the RGB values of the pixel. At 515, if the pixel being evaluated is determined to be a color pixel or a white pixel, the process proceeds to 520. At 520, the process draws the pixel in the color image at the equivalent coordinates with respect to the source image.

It will be appreciated that in one embodiment, when generating the color image, an image that has the same dimensions as the source image but filled with all white pixels can be generated as the color image. Then color pixels of the source image can be drawn (or added/copied) at the equivalent coordinates in the color image (to replace the pre-filled white pixels) with respect to the source image during the scanning of the source image. In such embodiment, since the color image has already been pre-filled with white pixels, if there is a need to add white pixels to the color image, nothing needs to be done.

At 515, if the pixel being evaluated is neither a color nor a white pixel, the process proceeds to 525. At 525, the print trapping configuration is checked. If the print trapping feature is not enabled, the process proceeds to 535. At 535, a white pixel is drawn at the equivalent coordinates (of the pixel being evaluated) in the color image with respect to the source image. If the print trapping feature is enabled, the process proceeds to 530.

At 530, neighboring color pixels of the pixel being evaluated are searched. The current pixel spread depth for the search is n (starting with 1). It will be appreciated that a user can define the direction of pixel spread. The process then proceeds to 540.

At 540, if an adjacent (i.e., neighboring) color pixel (of the pixel being evaluated) at pixel spread depth n is found, the process proceeds to 550 or optional 545. At 550, the process draws the pixel (being evaluated) in the color image at the equivalent coordinates with respect to the source image. At 545, blending is applied to the pixel being evaluated. Then the process proceeds to 550.

At 540, if an adjacent (i.e., neighboring) color pixel (of the pixel being evaluated) at pixel spread depth n is not found, the process proceeds to 555. At 555, if it is determined that all surrounding pixels (of the pixel being evaluated) are white, the process proceeds to 565. At 565, a white pixel is drawn at the equivalent coordinates (of the pixel being evaluated) in the color image with respect to the source image.

At 555, if it is determined that not all surrounding pixels (of the pixel being evaluated) are white, the process proceeds to 560. At 560, n is increased by 1. Then the process proceeds to 570. At 570, if the current pixel spread depth n exceeds the configured maximum pixel spread depth, the process proceeds to 565. At 570, if the current pixel spread depth n is equal to or less than the configured maximum pixel spread depth, the process proceeds back to 540.

After 520, 535, 550, or 565, the actions on the current pixel (the pixel being evaluated) are complete, and the process moves to the next pixel of the source image and repeat the processes described in the diagram of FIG. 5.

Figure 6:
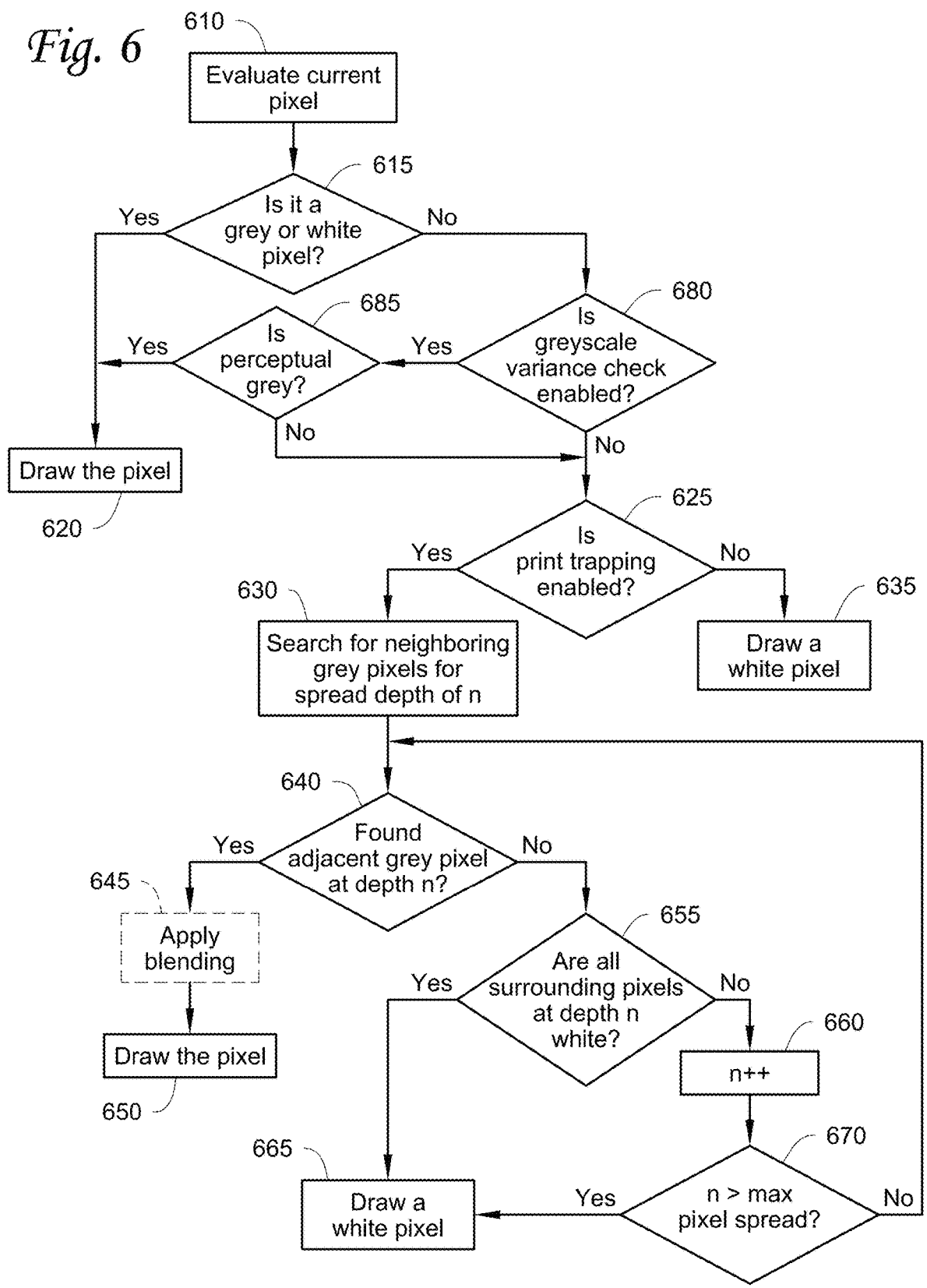
FIG. 6 illustrates a flow chart depicting steps in generating the monochrome digital image from the source digital image.

FIG. 6 illustrates a diagram of generating a monochrome image based on a source image. The processes described in the diagram of FIG. 6 can be performed, for example, by the controller. The processes in FIG. 6 are based off the similar or same processes discussed in the previous sections. The source image is the image that a user would like to print on a plastic card. Methods and systems described herein can achieve the print task/job by generating a color image and a monochrome image based on the source image, using CMYK printing, printing the color image using CMY panels, and printing the monochrome image using K panel.

In one embodiment, the monochrome image can start with an empty image (i.e., having size of 0). When generating the monochrome image, the source image is scanned pixel by pixel. At 610, each pixel of the source image is evaluated based on, for example, the RGB values of the pixel. At 615, if the pixel being evaluated is determined to be a grey pixel or a white pixel, the process proceeds to 620. At 620, the process draws the pixel in the monochrome image at the equivalent coordinates with respect to the source image.

It will be appreciated that in one embodiment, when generating the monochrome image, an image that has the same dimensions as the source image but filled with all white pixels can be generated as the monochrome image. Then grey pixels of the source image can be drawn (or added/copied) at the equivalent coordinates in the monochrome image (to replace the pre-filled white pixels) with respect to the source image during the scanning of the source image. In such embodiment, since the monochrome image has already been pre-filled with white pixels, if there is a need to add white pixels to the monochrome image, nothing needs to be done.

At 615, if the pixel being evaluated is neither a grey nor a white pixel, the process proceeds to 680. At 680, the greyscale variance check configuration is checked. If the greyscale variance check is enabled, the process proceeds to 685. At 685, if the pixel being evaluated is perceptual grey, the pixel being evaluated is converted to a grey pixel, and the process proceeds to 620. At 620, the process draws the converted pixel in the monochrome image at the equivalent coordinates with respect to the source image.

At 685, if the pixel being evaluated is not perceptual grey, the process proceeds to 625. At 680, if the greyscale variance check is not enabled, the process also proceeds to 625. At 625, the print trapping configuration is checked. If the print trapping feature is not enabled, the process proceeds to 635. At 635, a white pixel is drawn at the equivalent coordinates (of the pixel being evaluated) in the monochrome image with respect to the source image. If the print trapping feature is enabled, the process proceeds to 630.

At 630, neighboring grey pixels of the pixel being evaluated are searched. The current pixel spread depth for the search is n (starting with 1). It will be appreciated that a user can define the direction of pixel spread. The process then proceeds to 640.

At 640, if an adjacent (i.e., neighboring) grey pixel (of the pixel being evaluated) at pixel spread depth n is found, the process proceeds to 650 or optional 645. If 645 is not performed, at 650, the pixel being evaluated is converted to a grey pixel, and the process draws the converted pixel in the monochrome image at the equivalent coordinates with respect to the source image. At 645, the pixel being evaluated is converted to a grey pixel, and blending is applied to the converted pixel. Then the process proceeds to 650. If 645 is performed, at 650, the process draws the converted pixel in the monochrome image at the equivalent coordinates with respect to the source image.

At 640, if an adjacent (i.e., neighboring) grey pixel (of the pixel being evaluated) at pixel spread depth n is not found, the process proceeds to 655. At 655, if it is determined that all surrounding pixels (of the pixel being evaluated) are white, the process proceeds to 665. At 665, a white pixel is drawn at the equivalent coordinates (of the pixel being evaluated) in the monochrome image with respect to the source image.

At 655, if it is determined that not all surrounding pixels (of the pixel being evaluated) are white, the process proceeds to 660. At 660, n is increased by 1. Then the process proceeds to 670. At 670, if the current pixel spread depth n exceeds the configured maximum pixel spread depth, the process proceeds to 665. At 670, if the current pixel spread depth n is equal to or less than the configured maximum pixel spread depth, the process proceeds back to 640.

After 620, 635, 650, or 665, the actions on the current pixel (the pixel being evaluated) are complete, and the process moves to the next pixel of the source image and repeat the processes described in the diagram of FIG. 6.

Print Commands

The source image is typically a composite image that includes all relevant text (e.g. personal account number, customer name, etc.), customer photo, and background image. Processing the source image (for example, through the pixel extraction, print trapping, and/or blending processes) can result in a color digital image and a monochrome digital image. The color digital image and the monochrome digital image can be sent to the plastic card printing mechanism with two separate function calls to specify which ribbon panels to use for image rendering (for example, one function call is for CMY for the color image and the second function call can be for K for the monochrome image). The function call for the color image can include all the color pixels of the source image with grey pixels being extracted, the spread pixels (through print trapping), and/or blending (CMY+blending) being applied to the spread pixels. The function call for the monochrome image can include all the grey pixels of the source image with color pixels being extracted, the spread pixels (through print trapping), and/or blending (K+blending) being applied to the spread pixels.

Card Set-Up

A user can configure the printing setup for printing plastic cards via for example, a Graphic User Interface (GUI). The user can configure the printing setup with proper aliasing, layering, saturation and/or desaturation. In one embodiment, the user can set up printing color text or color logos as aliased. The user can also setup the supplied original image in layers. For example, bank logo, identifiers, and/or text can be on a different layer than the grey/black background image. Background image/layer (that is to print using the K panel only) can be configured to be desaturated. It will be appreciated that saturation is typically used to describe the intensity of color in the image. A saturated image typically has overly bright colors. Aliasing, layering and saturation/desaturation are well known techniques in the art of card set-up for card printing.

It will also be appreciated that the processing operation(s) performed on the plastic card can include one or more of multi-color printing, monochromatic printing, laminating one or more sides of a card, encoding a magnetic stripe on the card, programming of an integrated circuit chip embedded in the card, embossing, indent printing, card cleaning, laser printing, card de-bowing, and the like.

Figure 7:
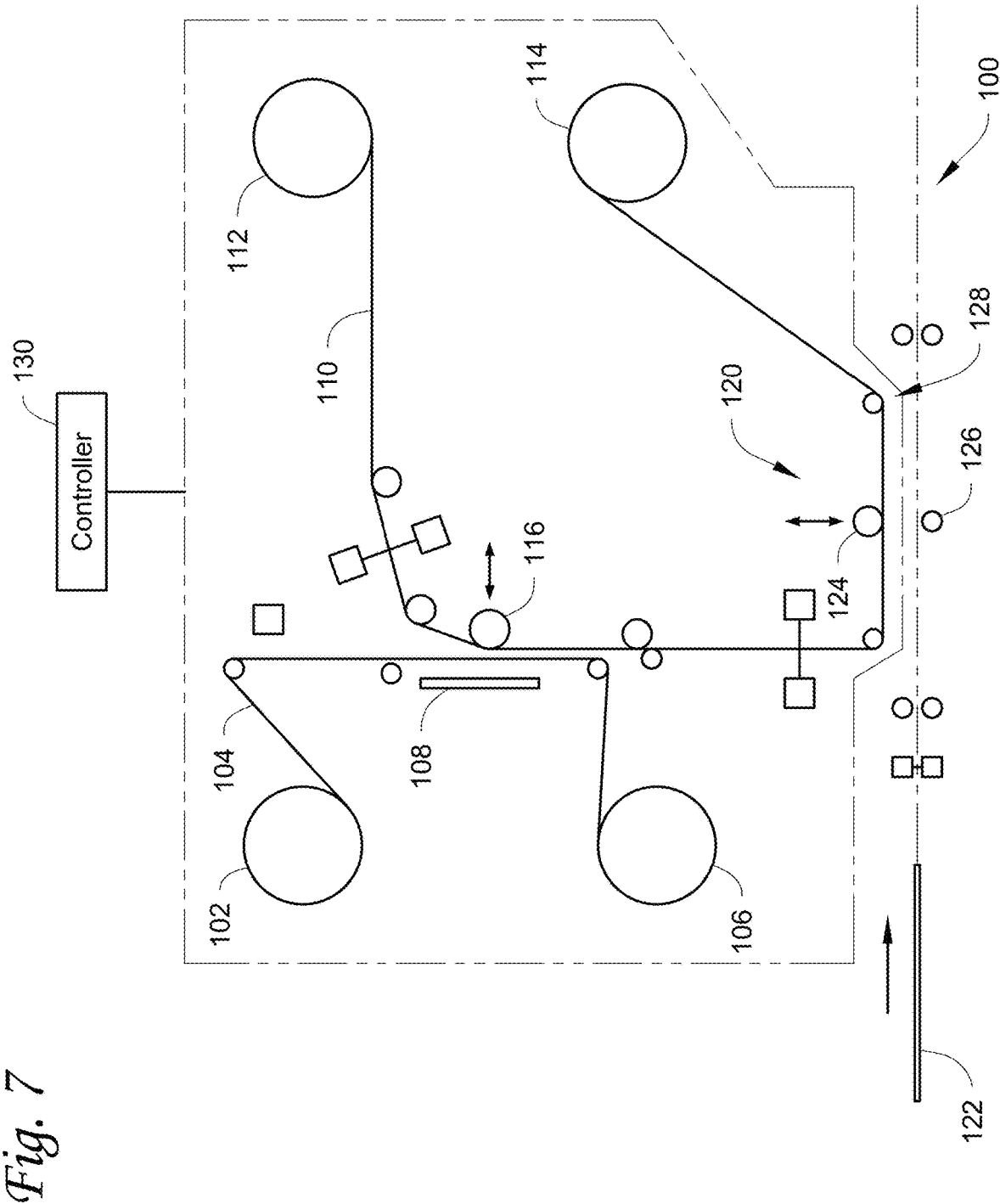
FIG. 7 illustrates a portion of a plastic card printing mechanism used in a plastic card processing mechanism.

FIG. 7 illustrates a portion of a plastic card printing mechanism 100 used in a plastic card processing mechanism on which the techniques described herein can be implemented to print vibrant grey cards. The printing mechanism 100 is illustrated as performing retransfer printing. However, the printing mechanism 100 can be configured to perform direct-to-card printing as well.

The specific construction and operation of retransfer printers, including the print ribbon, the retransfer film, printing an image on the retransfer film, and transferring the printed image onto a surface of a card, is well known in the art. One example of retransfer printing is disclosed in U.S. Pat. No. 6,894,710 among many others. U.S. Pat. No. 6,894,710 is incorporated herein by reference in its entirety. The illustrated retransfer printing configuration of the printing mechanism 100 includes a print side that includes a print ribbon supply 102 from which a supply of print ribbon 104 is supplied, and a print ribbon take-up 106 that takes-up used print ribbon 104. The print ribbon is directed past a print head 108, which in the illustrated example can be stationary, and which conducts printing using the print ribbon 104 onto a retransfer film 110. After printing, the used print ribbon 104 is then wound onto the take-up 106.

The retransfer film 110 is supplied from a film supply 112 on a retransfer side, and after retransfer the remaining film 110 is wound onto a film take-up 114 also on the retransfer side. The retransfer film 110 is directed past a platen roller 116 positioned opposite the print head 108 and which in the illustrated example can be moved toward and away from the print head 108 to press the retransfer film 110 and the print ribbon 104 between the print head 108 and the platen roller 116 during printing onto the retransfer film 110. The retransfer film 110 can be any retransfer film 110 that has a transferrable material layer(s) that can be transferred from the retransfer film 110 onto the plastic card substrate.

The section of the retransfer film 110 with the printed image is then advanced to a transfer station 120 where the intermediate retransfer material bearing the printed image is transferred onto the surface of a card 122. In this example, the transfer station 120 includes a heated transfer mechanism 124, for example a transfer roller, that is movable toward and away from a fixed platen 126 positioned on the opposite side of a card travel or transport path. The heated transfer mechanism 124 presses the portions of the retransfer film 110 containing the printed image against the card 122 which is backed by the platen 126, with the retransfer film 110 and the card 122 then being transported together past the heated transfer mechanism 124 to transfer the transferrable material layer(s) of the retransfer film 110 containing the printed image onto the card surface. The retransfer film 110 and the card 122 are then transported to a stripping station 128 where the transferrable material layer(s) of the retransfer film 110 is stripped from the card 122 leaving behind the retransfer material bearing the printed image on the card 122. The remainder of the retransfer film 110, minus the transferred material is then wound onto the film take-up 114. The card 122 is transported along the card travel path by a card transport mechanism well known in the art, such as sets of rollers.

A controller 130 controls operation of the printing mechanism 100. In one embodiment, the controller 130 can implement the pixel extraction process and/or a print trapping process described above, as well as generate and send the CMY+blending print command and the K+blending print command to the printing mechanism 100. The controller 130 can also control the card set-up described above.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method of printing on a surface of a card or a passport in a card or passport printing mechanism, the method comprising:
   a) generating color digital image data from color pixels of a source digital image and monochrome digital image data from monochrome pixels of the source digital image; and
   b) sending the color digital image data and the monochrome digital image data to the card or passport printing mechanism, and printing a color image on the surface of the card or the passport using the color digital image data and printing a monochrome image on the surface of the card or the passport using the monochrome digital image data, wherein the color image and the monochrome image produce a combined image on the surface.

2. The method of claim 1, wherein b) comprises printing the color image and the monochrome image on a transferrable printing receptive layer of a retransfer material to produce the combined image, and thereafter transferring the transferrable printing receptive layer containing the combined image to the surface of the card or the passport.

3. The method of claim 1, wherein the card comprises a financial card having at least one of a magnetic stripe and an integrated circuit chip.

4. The method of claim 1, wherein the card comprises a plastic card.

5. The method of claim 4, wherein the source digital image contains two or more of a background image, a card issuer name, a card issuer logo, a personal account number, a cardholder name, an expiration date, a payment network name, and a payment network logo.

6. The method of claim 1, wherein a) includes, for the color digital image data, replacing every pixel at coordinates corresponding to the monochrome pixels with white pixels; and for the monochrome digital image data, replacing every pixel at coordinates corresponding to the color pixels with white pixels.

7. The method of claim 1, wherein b) includes printing the color image using cyan, magenta and yellow pigment ink; and printing the monochrome image using black pigment ink.

8. The method of claim 1, wherein b) includes printing the color image and/or the monochrome image using drop on demand printing.

9. A method of printing on a surface of a card or a passport in a card or passport printing mechanism, the method comprising:
   a) generating color digital image data from color pixels of a source digital image and monochrome digital image data from monochrome pixels of the source digital image; and
   b) sending the color digital image data and the monochrome digital image data to the card or passport printing mechanism, and printing a color image on the surface of the card or the passport using the color digital image data and printing a monochrome image on the surface of the card or the passport using the monochrome digital image data, wherein the color image and the monochrome image produce a combined image on the surface,
   wherein a) further includes:
   1) for the color digital image data, determining if red, green, blue (RGB) values of each pixel of the source digital image are substantially equal, and for every pixel of the source digital image where the RGB values are substantially equal, replacing every pixel with equal RGB values with a white pixel; and
   2) for the monochrome digital image data, replacing every pixel at coordinates corresponding to the replaced pixels in 1) with grey pixels.

10. The method of claim 1, wherein a) further includes applying print trapping for the color digital image data, and applying print trapping for the monochrome digital image data.

11. A method of printing on a surface of a card or a passport in a card or passport printing mechanism, the method comprising:
   a) generating color digital image data from color pixels of a source digital image and monochrome digital image data from monochrome pixels of the source digital image; and
   b) sending the color digital image data and the monochrome digital image data to the card or passport printing mechanism, and printing a color image on the surface of the card or the passport using the color digital image data and printing a monochrome image on the surface of the card or the passport using the monochrome digital image data, wherein the color image and the monochrome image produce a combined image on the surface,
   wherein a) further includes applying print trapping for the color digital image data, and applying print trapping for the monochrome digital image data,
   wherein applying print trapping for the color digital image data comprises:
   for each monochrome pixel in the source digital image, determining if there are neighboring color pixels;
   i) if there are neighboring color pixels, add the monochrome pixel to the color digital image data; and
   ii) if there are not neighboring color pixels, change the monochrome pixel to a white pixel.

12. The method of claim 10, wherein applying print trapping for the monochrome digital image data comprises:
   for each color pixel in the source digital image, determining if there are neighboring monochrome pixels;
   if there are neighboring monochrome pixels, the color pixel is changed to a monochrome pixel and added to the monochrome digital image data.

13. The method of claim 10, wherein the card comprises a financial card having at least one of a magnetic stripe and an integrated circuit chip.

14. The method of claim 10, wherein the card comprises a plastic card.

15. The method of claim 14, wherein the source digital image contains two or more of a background image, a card issuer name, a card issuer logo, a personal account number, a cardholder name, an expiration date, a payment network name, and a payment network logo.

\* \* \* \* \*